US010636079B2

(12) United States Patent
Shiely et al.

(10) Patent No.: US 10,636,079 B2
(45) Date of Patent: Apr. 28, 2020

(54) DEMAND-BASED PRODUCT SOURCING

(71) Applicant: BBY SOLUTIONS, INC., Richfield, MN (US)

(72) Inventors: Brent Shiely, Eden Prairie, MN (US); Bradley R. McBeath, Hopkins, MN (US); Trevis Williamson, Minneapolis, MN (US); Bradley K. Struble, Lakeville, MN (US); Jeffrey D. Rathburn, Minneapolis, MN (US); Vaibhav Agrawal, Eden Prairie, MN (US); Amy Williams, Stillwater, MN (US); Pranab Koner, Eagan, MN (US); Vyas Mohan Mohan, Chanhassen, MN (US); Tanmay Sinha, Apple Valley, MN (US); David R. Leeder, Lakeville, MN (US); Nicholas E. Oswald, Maple Grove, MN (US); Rick E. Allan, Prior Lake, MN (US); Rambabu Raipati, Bloomington, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 1258 days.

(21) Appl. No.: 14/858,584

(22) Filed: Sep. 18, 2015

(65) Prior Publication Data
US 2017/0083967 A1 Mar. 23, 2017

(51) Int. Cl.
*G06Q 30/00* (2012.01)
*G06Q 30/06* (2012.01)

(52) U.S. Cl.
CPC ..... *G06Q 30/0639* (2013.01); *G06Q 30/0641* (2013.01)

(58) Field of Classification Search
CPC .................. G06Q 30/0639; G06Q 30/0641
(Continued)

(56) References Cited

U.S. PATENT DOCUMENTS 6,263,317 B1 * 7/2001 Sharp ..................... G06Q 30/06
705/26.81
7,747,543 B1 6/2010 Braumoeller et al.
(Continued)

OTHER PUBLICATIONS

Mahar et al.: "Enterprise Systems Focused Collection: Dual Channel Supply Chains: Challenges and Opportunities in E-Fulfillment," Production and Inventory Management Journal 47.2: 14-30; Dialog ISSN #08978336, 19pgs. (Year: 2011).*
(Continued)

*Primary Examiner* — Robert M Pond
(74) *Attorney, Agent, or Firm* — Schwegman Lundberg & Woessner, P.A.

(57) ABSTRACT

Techniques and system configurations for demand-based product sourcing in an electronic commerce setting is described herein. In one example, information about an item corresponding to a plurality of fulfillment locations is stored in a database. The information includes a plurality of transit times and a plurality of transit costs corresponding to each of the plurality of transit times. A subset of transit times is selected upon receiving a location of a user. A subset of transit costs corresponding with the subset of transit times is selected. An indication of a selection of a transit time is received. The indication includes the item, a quantity of the item, and a destination. A preferred fulfillment location of a subset of fulfillment locations is calculated, the calculating using the transit time, the location, and a selection rule, wherein the selection rule is generated using a plurality of selection attributes.

21 Claims, 12 Drawing Sheets

(58) Field of Classification Search
USPC .............................................. 705/26, 27, 28
See application file for complete search history.

(56) References Cited

U.S. PATENT DOCUMENTS

| | | | |
|---|---|---|---|
| 8,249,917 B1 | 8/2012 | Kassmann | |
| 8,374,922 B1* | 2/2013 | Antony | G06Q 30/00 |
| | | | 705/26.1 |
| 8,533,053 B2* | 9/2013 | Brown | G06Q 30/00 |
| | | | 705/26.1 |
| 8,615,473 B2 | 12/2013 | Spiegel | |
| 9,152,987 B1 | 10/2015 | Petrich et al. | |
| 2003/0093388 A1* | 5/2003 | Albright | G06Q 10/08 |
| | | | 705/400 |
| 2007/0156536 A1* | 7/2007 | Alfandary | G06Q 10/087 |
| | | | 705/22 |
| 2011/0173028 A1* | 7/2011 | Bond | G06Q 10/08 |
| | | | 705/3 |
| 2014/0095350 A1 | 4/2014 | Carr et al. | |
| 2014/0279277 A1 | 9/2014 | Pei | |
| 2017/0024804 A1* | 1/2017 | Tepfenhart, Jr. | G06Q 30/0635 |

OTHER PUBLICATIONS

"Is Ship-from-Store Distribution Right for You?, 10 Things to Consider When Using Stores as Distribution Nodes", © Fortna, (Dec. 2014), 1-7.

"Ship-from-Shore Distribution: Reducing the Impact of an Imperfect Forecast", © Fortna, (Dec. 2014), 1-7.

\* cited by examiner

EXAMPLE OF A SOURCING PROCESS

EXAMPLE OF A FULFILLMENT PROCESS

EXAMPLE OF A FULFILLMENT PROCESS

US 10,636,079 B2

DEMAND-BASED PRODUCT SOURCING

TECHNICAL FIELD

Embodiments pertain to order sourcing, fulfillment, logistics, and related data management techniques for purchases of items of commerce. Some embodiments pertain to techniques that track, manage, and modify electronic data and information related to orders for such items of commerce, to enable the sourcing of electronic commerce (e-commerce) orders from a variety of locations including brick-and-mortar retail stores located in proximity to the order destination.

BACKGROUND

Many retailers and distributors of goods are increasingly blending electronic (e.g., website and mobile app) purchasing activity with retail (e.g., in-person) purchasing activity. E-tail and Retail are blending more and more. For example, retail locations may maintain an inventory that a website may be capable of making available for purchase. Customers often do not care about the source of the delivery, whether this is from a store or from a distribution center—just that the correct product arrives in a timely fashion.

As the prevalence of electronic commerce options have increased, some retailers have begun to offer sourcing from brick-and-mortar stores, often termed as "ship-from-store". Existing techniques to manage sourcing from ship-from-store often involve ad-hoc processes and rules and significant levels of human oversight and management. This leads to significant cost and complexity when attempting to manage a high volume of orders among many physical locations.

Likewise, from a consumer perspective, as the prevalence of electronic commerce options have increased, customers have increasingly demand detailed delivery options (based on speed and cost considerations) and more precise delivery dates and delivery date guarantees. Existing retailer processes for sourcing orders to meet a delivery date have become extremely complex for a retailer, and involves many considerations. Accordingly, existing mechanisms for providing information about ship-from-store orders have been limited. The existing processes may lead to unexpected inventory shortages and unreliable product fulfillment.

DETAILED DESCRIPTION

Figure 1:
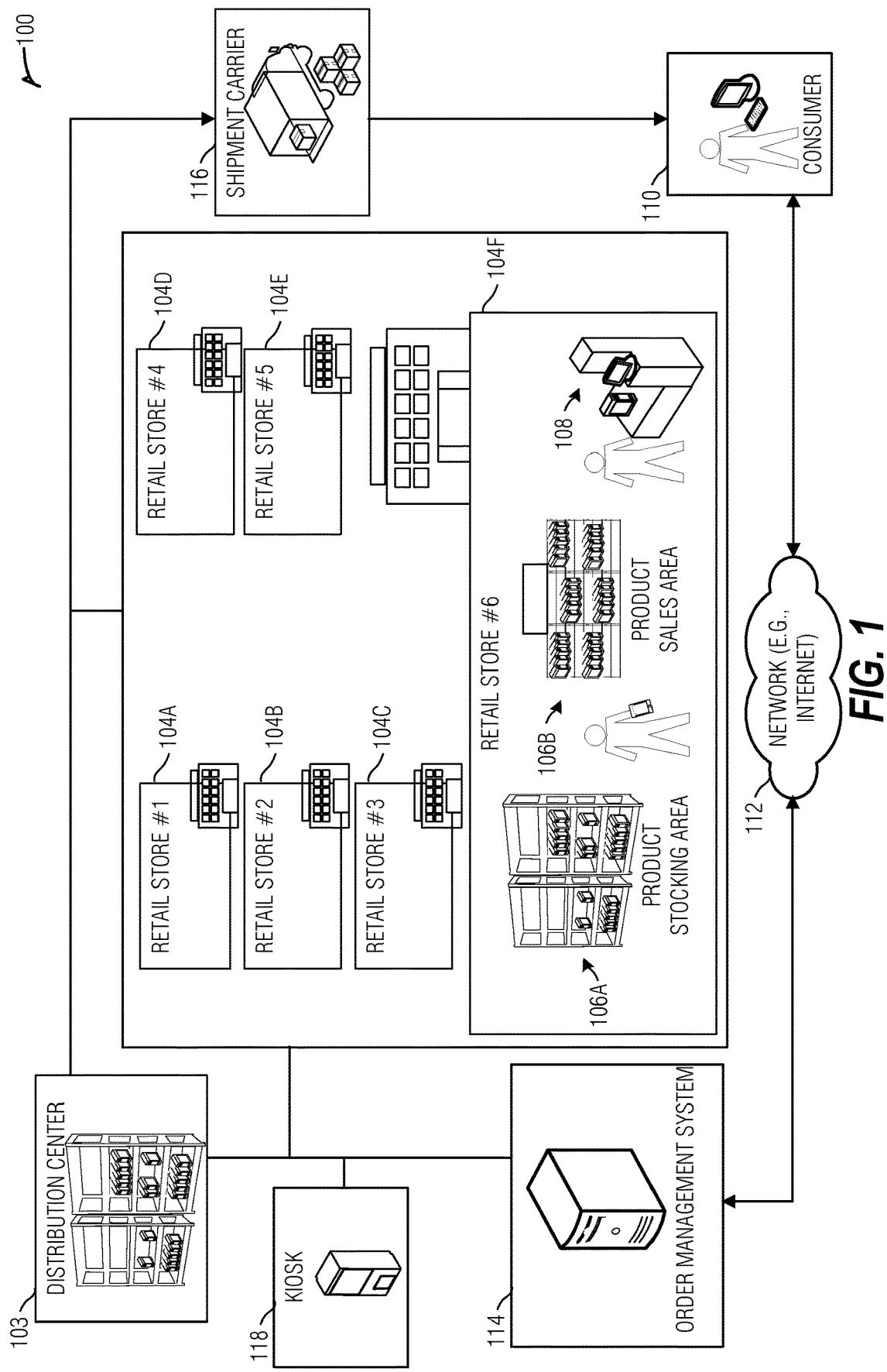
FIG. 1 illustrates an overview of product sourcing and fulfillment according to an example described herein.

The following description and drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some of the examples detailed herein are directed to techniques that enable item source selection and order fulfillment in connection with product management workflows and related data management actions. As discussed herein, store and omnichannel retail fulfillment techniques may be used for ensuring customer delivery of orders and shipments based on inventory transit time availability and customer transit time and transit cost preferences. For example, the techniques discussed herein can operate to: identify products from local stores or distribution centers to provide estimated transit times; generate transit times and costs for a customer contemplating an item purchase based on the customer's shipping location; select a preferred source of fulfillment; generate notification and fulfillment requests to local brick-and-mortar stores or distribution centers; coordinate courier or store-based delivery of the products from local stores or distribution centers; and adjust transit methods to meet delivery expectations.

As further discussed herein, the deployment of in-store resources may be used to automatically locate, generate, and fulfill orders to arrive before a promised or preferred time. In some scenarios it may be more efficient to fulfill orders from inventory of a retail store than a distribution center. For example, to reduce transit times and costs by shipping the order from a store that is in closer proximity to the customer than a distribution center. With use of these demand-based product sourcing techniques, a retailer can attempt to achieve a complete fulfillment of customer orders by meeting its promised delivery date. This has the logical benefit of providing a consistent and positive experience for customers, and enhanced customer satisfaction for the shipment process.

With the examples provided herein, technical enhancements can be implemented within a fully integrated, sustainable from-store delivery capability that is seamless and simple to execute against. The use of the workflow management techniques can be used to assist the delivery of products when, where and how the respective customers want to receive them—consistently and reliably on time. Further, the use of the techniques and workflows described herein can enable shipping and convenience benefits for a variety of types of deliveries, while reducing costs and improving customer experiences. In addition to such business-related benefits, the presently described techniques and workflows may be integrated into existing retailer information systems and computerized processing networks to enable improved processing and data management of orders and shipments. As further detailed herein, technical implementations of the present techniques may include the improved storage, access, and management of data; the improved operation of databases that track orders, shipments, and inventory; and improved uses of data to manage and automate delivery processes.

The following examples illustrate various enhancements that can be applied to allow a distribution and ship-from-store network to provide greater speed and delivery options for customers. As discussed herein, the enhancements to a retailer's operations and systems can be used to implement guaranteed shipping options, through: expanding the days and times of distribution operations; tracking and coordinating data maintained in order management and e-commerce product management systems; and expanding the diversification of transportation carriers to enhance speed and choice of delivery options. Further, the enhancements may include the integration of an in-store shipping tool that will allow for the systematic upgrade or downgrade of a particular order's "shipping speed" in order to optimize cost and meet any customer requested or promised "in-hand" date.

As described herein, the various techniques for demand-based product sourcing may be provided through the use of a fully integrated, sustainable from-store delivery capability that is seamless and simple to execute against. In some examples, the demand-based product sourcing may be implemented as a simple contingency plan with minor automation and manual intervention to close gaps in coverage; in another example, the delayed order and delayed shipment fulfillment may be implemented as a comprehensive automated model. As also described herein, these fulfillment techniques may build around existing retail processes and systems, with improvements to existing shipment processes being used to keep customer experiences positive and consistent. Similarly, these fulfillment techniques may integrate with new data processes and system upgrades, to enable long-term cost effectiveness, and to enable retail tracking and location-based tracking of sales (for example, to allow a particular retail location to obtain credit for any sales that the location is responsible for fulfilling).

As a result of the techniques described herein, a retailer can significantly increase the inventory exposed for sale while minimizing the risk of overselling. As a result, such delivery improvements will have the effect of setting expectations for when an order will arrive for a customer which in turn may lead to increased customer satisfaction. Further, the techniques described herein may be used in connection with advanced analytics and coordination for order and shipment creation, sourcing, and delivery, through appropriate management, synchronization, coordination, and tracking of data for orders, shipments, inventory levels, purchase transactions, and related corporate purchase and fulfillment operations.

As used in the following examples, the term "order" generally refers to an electronically-tracked (and, potentially electronically-originating) request for fulfillment of a purchase for a particular set of one or more goods. This request may originate from a consumer purchase from an electronic point of sale system, an electronic commerce website, or from other systems operated by a retailer. As also used in the following examples, the term "transit" refers to an electronically-tracked instance of transit or shipping, used to fulfill the delivery of the order, that includes all or a portion of the particular set of the one or more goods. This instance of transit may be initiated by the retailer, by a third party fulfillment provider, by a distributor or manufacturer, or by other entities on behalf of the retailer. The movement of this instance of transit may be performed by a common carrier, a contract or private carrier, or by entities associated with or under contract with the retailer, distributor, or manufacturer.

It will be understood that in some of the following scenarios, the terms "order" and "shipment" may be used interchangeably. For example, when a package is in transit, the status of the order (e.g., being delayed due to shipping issues) will naturally correspond to the status of the shipment (e.g., being delayed due to weather issues in the shipping distribution network). However, it will be understood that the techniques described herein are not only applicable to the identification of a potentially delayed shipment, but also a potentially delayed order, and including in some scenarios, before goods associated with the order are prepared for shipment.

FIG. 1 illustrates an overview of product sourcing and fulfillment according to various examples in the present disclosure. A retailer may provide the sale and distribution of goods through various retail stores 104A, 104B, 104C, 104D, 104E, 104F, an order management system 114, and a distribution center 103. For example, an e-commerce order may occur in connection with the placement of an order by a customer 110 through the website, mobile app, or other order management system 114 over a network 112 (e.g., the internet). This e-commerce order may be followed by fulfillment of the order through a shipment sent from the distribution center 112 for delivery to the consumer 110 (such as with a scheduled delivery to the consumer's home or work place). In other examples, the e-commerce order may take place in connection with the fulfillment of a ship-from-store order, such as an order fulfilled from a particular retail store such as retail store 104A, or from a third party manufacturer or distributor (not shown).

Accordingly, in a workflow that manages and implements the sourcing and fulfillment of the customer's 110 e-commerce order can operate various data-driven procedures to identify sources of inventory capable of being fulfilled and delivered in accordance with the transit times provided to the customer 110. For example, commerce operations may occur at a data terminal 108 or other control station of the retail store 104F to process the creation and handling of order fulfillment from the inventory of the retail store 104F. These data-driven commerce operations may include sourcing logic, inventory availability, order acceptance and shipping, error handling (e.g., delay detection), and the like.

A retailer may maintain an inventory of items available for sale in an inventory database (not shown). Each inventory item may have attributes such as a stock keeping number (SKU), quantity on-hand, weight, size, etc. The inventory items may have an attribute designating whether the item is available to be shipped from a retail store such as retail store 104A. For example, the item may have a binary ship-from-store (SFS) enabled attribute that may be set to either Y for yes or N for no. Inventory control of ship-from-store enabled items may happen at the store level or at a regional level.

In some example embodiments, the inventory items may have a ship-from-anywhere (SFA) attribute indicating that the inventory item is available to ship from any fulfillment source including a retail store such as retail store 104A. The SFA attribute may be a global attribute that automatically designates the inventory item as SFS enabled without relying on retail store specific attributes.

A floor quantity may be implemented at the store level to holdback SFS enabled inventory for in-store sales. In one example, a retail store such as retail store 104F may have thirty five units of a particular television in product stocking area 106A, product sales area 106B, or at other locations in the retail store 104F. The retail store 104F may require twenty units of the television to remain in-stock to meet demand for in-store sales (e.g., based on sales forecasts, sales history, sales promotions, etc.) leaving the additional fifteen units of the television as available for e-commerce orders. This inventory floor may prevent the retail store 104F from running out of inventory for in-store sales before the retail store 104F is restocked.

A threshold quantity may be implemented at the regional level or throughout all of the retail stores to holdback SFS enabled inventory for in-store sales. In one example, the retail stores 104A, 104B, 104C, 104D, 104E, and 104F, collectively "the store group," may be in a metropolitan area near the customer's 110 shipping location. The retailer may set a threshold for the metropolitan area for the television units to reduce the likelihood of an inventory shortage for the metropolitan area. For example, the store group may collectively have one hundred television units above their respective inventory floors. The threshold may be set at forty units of the television leaving sixty units of the television allocated among the stores for fulfillment of e-commerce orders.

In some scenarios, the retailer may wish to holdback all SFS enabled inventory for a period of time (e.g., for a special promotion, new product, etc.). The inventory item may have a street date attribute signifying the date the product is available in-store. The inventory may also have a drop days attribute that designates how many days before or after the street date the item is available for e-commerce orders. For example, a smart watch may have a drop days attribute of 7 allowing the smart watch to be available for e-commerce orders 7 days after the street date. In another example, a computer mouse may have a drop days attribute of −2 allowing the computer mouse to be available for e-commerce orders 2 days before the street date.

Items may be listed for sale by the retailer to a potential buyer such as customer 110. The items may be pre-sourced to provide transit times and transit costs with the item listing based on the customer's 110 shipping location (e.g., zip code). For example, a particular computer mouse may be available for free standard shipping with and a transit time of 6 days, 2-day delivery for $9.99, and next day delivery for $14.99. The transit times and transit costs may be determined by comparing the shipping location to the available inventory and an available quantity of the item may be determined by transit time. For example, there may be 48 total computer mice available for shipping to zip code 90036 and of that total inventory 15 computer mice may be available for 2-day shipping, 5 computer mice are available for 1-day shipping, and 2 computer mice are available for same day shipping. The transit times and costs may represent a delivery expectation for the customer 110.

After determining that the user has added the item to a shopping list with a particular transit time the available inventory for the particular transit time based on the customer's 110 shipping location may be decremented by the quantity designated in the customer's 110 shopping list to prevent over sale of the item. For example, if there were 15 units of the computer mouse available for 2-day shipping to the customer's 110 zip code and the customer 110 adds 1 computer mouse to an electronic shopping cart with 2-day shipping 14 units would remain for 2-day shipping to the shipping zone encompassing the customer's 110 zip code. When the customer 110 removes the item from the shopping list or upon expiration of the shopping list the available inventory for the particular transit time based on the customer's 110 shipping location may be incremented by the quantity of the item no longer associated with the shopping list. For example, if there were 14 units of the computer mouse available for 2-day shipping to the customer's 110 zip code and the customer 110 removes 1 computer mouse with 2-day shipping from an electronic shopping cart 15 units would be available for 2-day shipping to the shipping zone encompassing the customer's 110 zip code.

The customer 110 may convert the shopping list into an order by completing a purchase transaction. The fulfillment of the shipment for the e-commerce order through distribution center 103 involves the transit of the first set of goods through a shipment carrier 116. However, as previously discussed, various scenarios may occur where the shipment is transmitted to a retail store such as retail store 104A to meet an estimated or promised delivery date or time. In such scenarios, a preferred source location such as retail store 104A may be selected based on a comparison of attributes corresponding to the preferred fulfillment source to the attributes of a plurality of potential fulfillment sources such as retail stores 104B, 104C, 104D, 104E, 104F, distribution center 103, or third party fulfillment sources.

The order may then be received by the order management system 114 for sourcing and fulfillment. The pre-sourcing data may be passed to the order management system 114 including a plurality of source locations able to meet the selected transit time, such as retail stores 104A-F. The order management system 114 may use rules based on a plurality of source selection attributes to select a preferred source location. These attributes may include, by way of example ant not limitation, ability of the source location to meet the transit time, distance between the source location and the customer's 110 location, inventory on-hand at the source location beneath replenishment level, source location rank, source location order cutoff time, systematic order cutoff time for a group of stores including the source location, ability of the source location to fulfill more than one item in an order, SKU status or health of the source location's inventory (e.g., clearance, end of life, etc.), item status for the source location (e.g., item no longer being restocked at source location), order acceptance rate for the source location (e.g., history of the source location ultimately fulfilling orders), source location's ability to fulfill at risk orders (e.g., orders that may not meet the selected transit time), number sent to the source location for a time period (e.g., a daily order capacity for the source location), etc.

For example, retail store 104A, retail store 104B, and retail store 104F may each have sufficient quantity of the mouse ordered by the customer 110 and may be able to meet the 2-day transit time selected by the customer 110. In the example, retail store 104A may have 10 mice available, retail store 104B may have 15 mice available, and retail store 104F may have 20 mice available. In this example, retail store 104F may be selected as the preferred source location because retail store 104F has the highest quantity of mice available.

Upon selection of the preferred source location, such as retail store 104F, the order management system 114 may consider attributes of items such as whether items in the order may be consolidated for shipping when determining the source location for other items in the order. Once the order management system 114 determines the items from the order that will be fulfilled by each source location an order release including order data may be created and passed through a fraud check before being released to the source location for fulfillment.

The order management system 114 may receive a pick/no pick response from the preferred source location indicating whether the source location can fulfill the items in the order. If the preferred source location is unable to fulfill the order the order management system 114 may reprocess the order for selection of a new preferred source location excluding the previous source location. For example, retail store 104A may send a no pick response to the order management system 114 and in response the order management system 114 may reprocess the order and send the order release to retail store 104F as the newly selected preferred source location. If the order management system 114 receives a pick message from the preferred source location fulfillment processing will continue.

The preferred source location, such as retail store 104F may display package configuration information for the order on a device such as a data terminal 108 or other control station of the retail store 104F. The order management system 114 may output one or more pick slips for the order at the data terminal 108 or other control station or print device of the retail store 104F. The order management system 114 may then send package data to one or more transit carriers such shipment carrier 116 to obtain transit service meeting the transit time selected and retrieve a transit tracking code. The tracking code may be added to the order data by the order management system 114. The order management system 114 may output one or more shipping labels and packing slips at the data terminal 108 or other control station or print device of the retail store 104F.

As shown in FIG. 1, the e-commerce order may be fulfilled from a retail store 104F and may include goods that are obtained from an in-store product stocking area 106A (e.g., in a local store inventory), a product sales area 106B (e.g., on a sales floor), or at other locations in the retail store 104F. When the items have been packaged by the source location including the items in the order the order can be provided to a carrier 116, for a delivery to the consumer 110, for example (or for delivery to other suitable locations such as a gift destination or an alternate delivery destination).

The order management system 114 may receive an acknowledgment of receipt of the packages corresponding with the order from the transit carrier. The order management system 114 may then update the order data and send a notification to the customer 110 that the order has shipped. The notification to the customer 110 may include the transit tracking code and an estimated delivery date.

In some example embodiments, a kiosk or locker such as kiosk 118 may be included as a source location for an item. The kiosk 118 may be a self-service location where the customer 110 can pick up an item that has been ordered. In an example, the kiosk 118 may have a stock of inventory items that are added to the pre-source data based on distance from the customer 110. The inventory item may be reserved from the stock of the kiosk 118 for fulfillment of the customer's 110 order. The customer may visit the kiosk 118 and provide identifying information (e.g., credit card swipe, username/password, etc.) upon which the item may be released to the customer 110. In an example, the item may be placed into a locker accessible to the customer 110 by the source location for pick up by the customer 110 (e.g., for pickup after the source location closes, in an area that does not have a staffed pickup location, etc.). In some example embodiments, the customer 110 may be presented with a list of kiosks including kiosk 118 where the item may picked up and the kiosk 118 is identified as the source location upon pickup.

Figure 2:
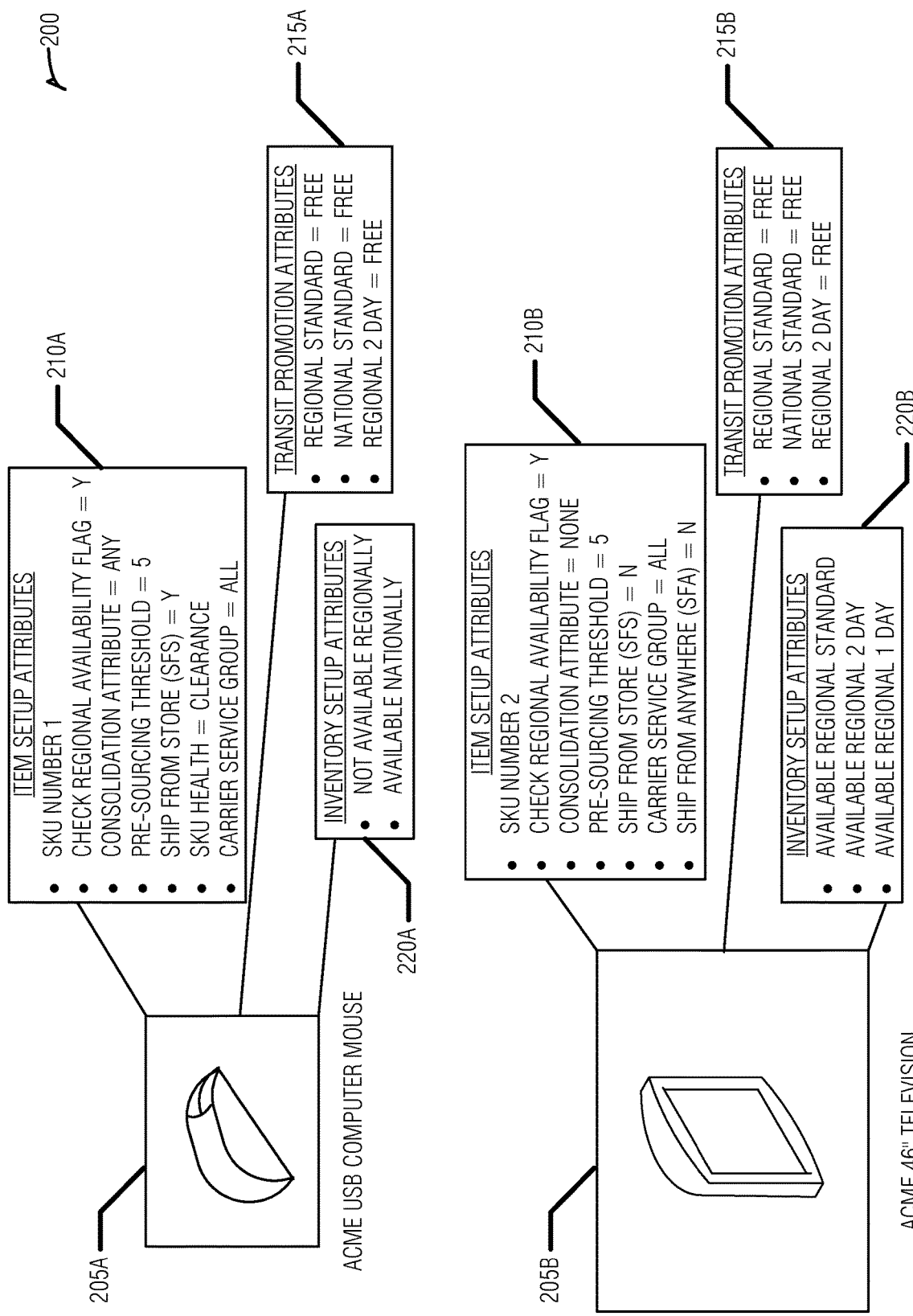
FIG. 2 illustrates an overview of attributes corresponding with an item to be sourced according to an example described herein.

FIG. 2 illustrates an overview 200 of attributes corresponding with an item to be sourced according to an example described herein. As shown, each item such as items 205A and 205B may have many attributes assigned. For example, item 205A has corresponding item setup attributes 210A, transit promotion attributes 215A, and inventory setup attributes 220A attribute classes. In the example, item 205B has corresponding item setup attributes 210B, transit promotion attributes 215B, and inventory setup attributes 220B attribute classes. It should be noted that while the example illustrates items 205A and 205B having the same attributes classes; there may be situations where items may have differing attribute classes. Attributes may be global for the inventory item or may be store specific. For example, a SKU health attribute may designate a computer mouse as clearance stock system-wide or may designate the computer mouse as clearance stock for a specific source location.

Figure 3:
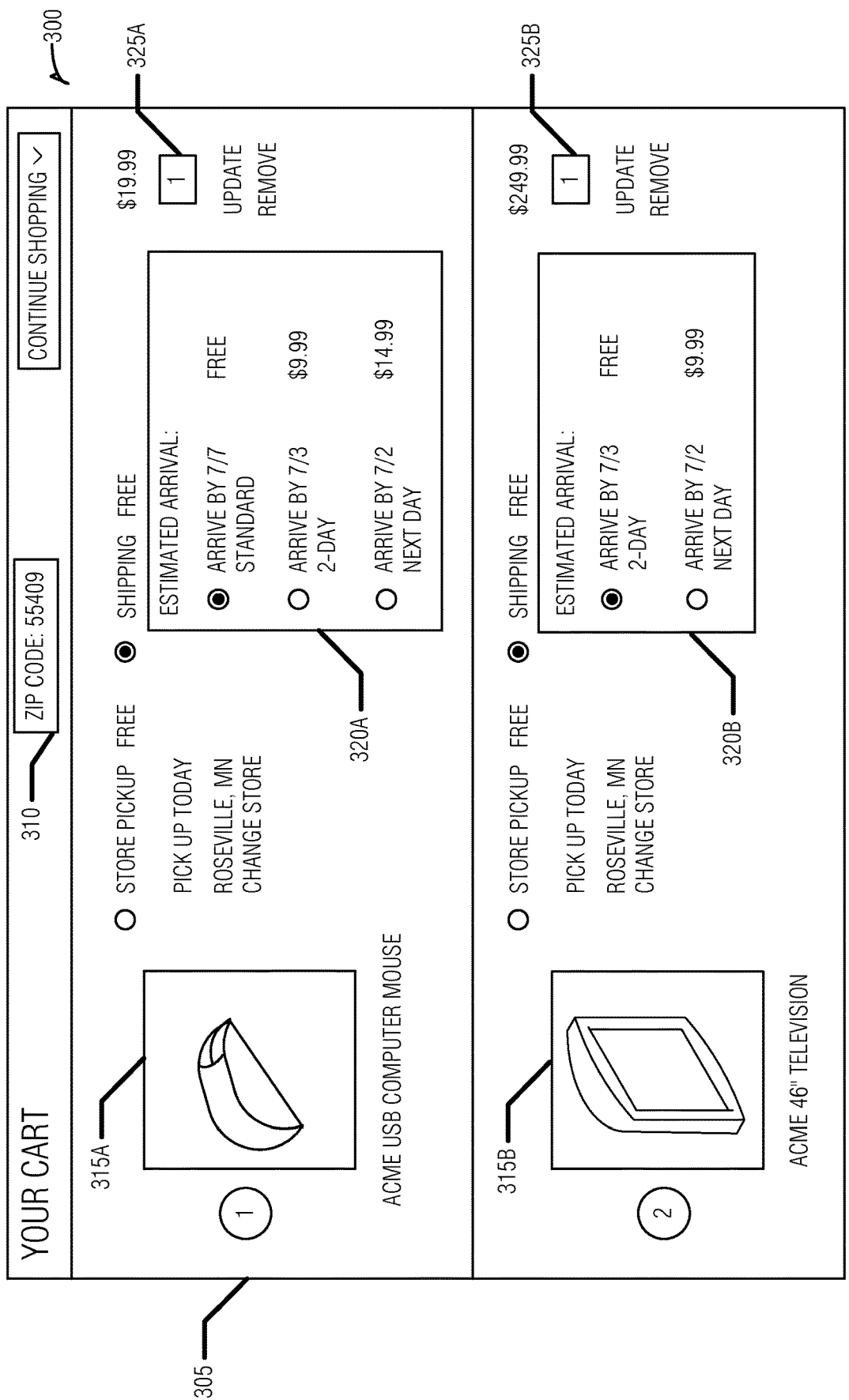
FIG. 3 illustrates an example screen of an online listing system according to an example described herein.

As shown, each item 205A and 205B may be assigned different attributes for each attribute class. For example, item 205A has an inventory setup attribute 220A of available nationally while item 205B has an inventory setup attributes 220B of available regional standard, available regional 2 day, and available regional 1 day. The attributes corresponding with each of the items 205A and 205B may be used throughout the inventory configuration, pre-sourcing, sourcing, and fulfillment processes FIG. 3 illustrates an example screen 300 of an online listing system according to an example described herein. In the example, a user has placed items in an electronic shopping cart 305 that includes an indication of a location 310 (e.g., shipping location, shopping location, etc.). The items available to the user may have been determined by the inventory configuration process as described in FIG. 1.

In the example, the items include a quantity 325A and 325B of a computer mouse 315A and a television 315B, respectively. The user may be provided with available shipping options and costs 320A and 320B corresponding with each item 315A and 315B, representing pre-sourcing data. The shipping options and costs 320A and 320B may represent a day the item will ship and a transit time or may represent an expected date of arrival. For example, the shipping option may be "Get it by tomorrow," "Get it by Friday," or "Get it before the big game" (e.g., before the super bowl). As described in FIG. 1, the pre-order data including the item (e.g., the mouse 315A), the quantity of the item (e.g., 325A), and the location 310 may be used in determining the shipping options and costs available. By way of example and not limitation, the location 310 may be determined by an input of a location input by the customer during a shopping session, by retrieving a location corresponding to a user profile of the customer stored on online listing system, and by comparing information of the customer's current session to a database of location information (e.g., the customer's incoming IP address, etc.).

Upon adding the items to the electronic shopping cart 305, the available inventory for the location 310 and transit option may be decremented by the quantity of the item. If the pre-order is not converted to an order the available inventory of the item for the location 310 and transit time may be incremented by the quantity of the item when it is clear an order will not be placed (e.g., the item is removed from the electronic shopping cart 305, the electronic shopping cart 305 session expires, etc.). Upon placing an order the order data will be processed for sourcing and fulfillment.

In some example embodiments, the transit time and transit cost options 320A and 320B may be displayed on a product description page and the selection of the transit time may be made on the product detail page. In some example embodiments arrival dates and corresponding costs may be attributes of an item listed on the online listing system. In an example, the customer may be able to filter search results based on the arrival dates and/or the corresponding costs.

Figure 4:
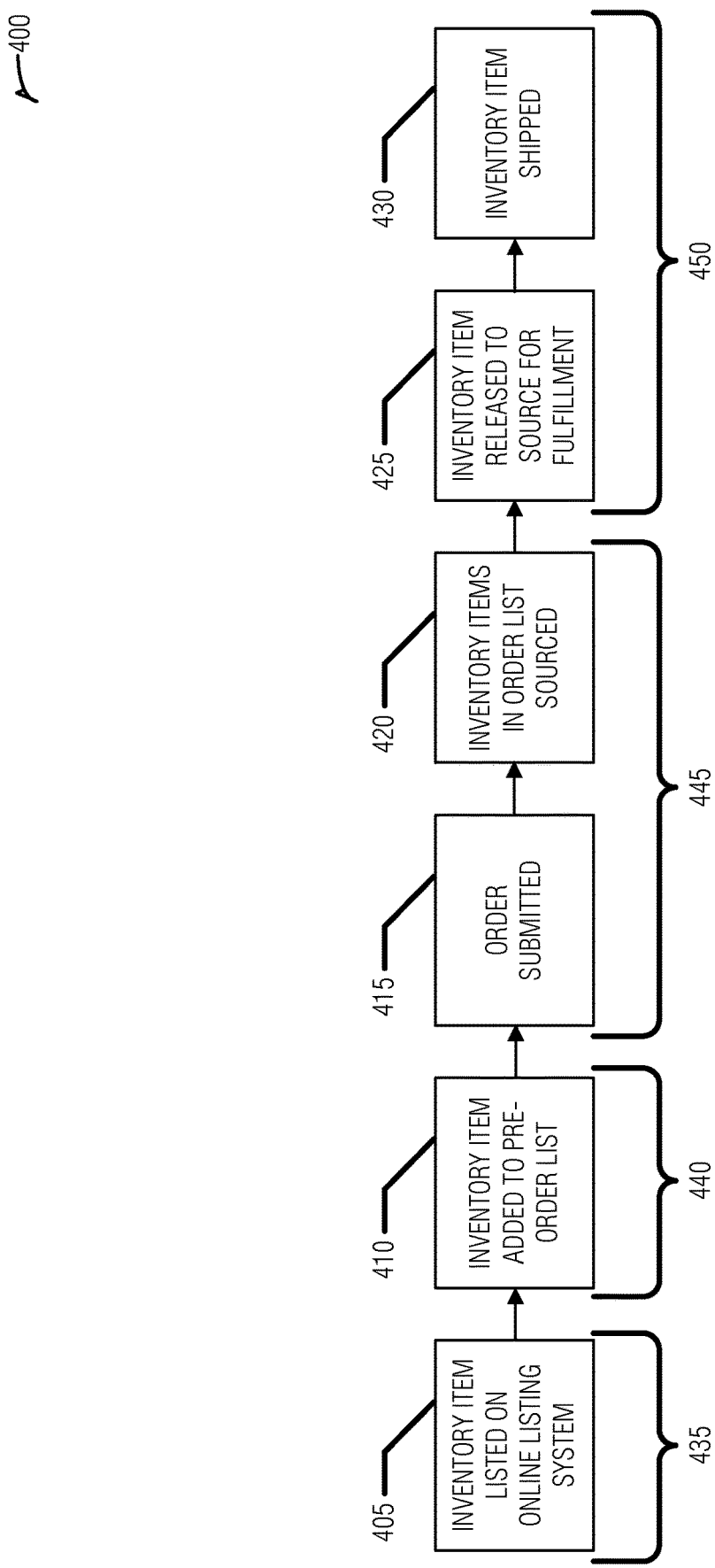
FIG. 4 illustrates an example data flow diagram for a product sourcing and fulfillment workflow according to an example described herein.

FIG. 4 illustrates an example data flow diagram for a product sourcing and fulfillment workflow 400 according to an example described herein. The processes of the workflow 400 may provide similar functionality to that described in FIG. 1. As shown, the data flow diagram in FIG. 4 illustrates data operations occurring among one or more electronic systems, which operate to act upon the inventory configuration 435, pre-sourcing 440, sourcing 440, and fulfillment 450 of inventory items. As will be understood, the sourcing and fulfillment of items in an order may be facilitated by use of the data-driven product sourcing system 500 described in FIG. 5, the workflows illustrated in the flow diagrams of an example of inventory configuration process 600 of FIG. 6, an example pre-sourcing process 700 of FIG. 7, an example sourcing process 800 of FIG. 8, and the flowcharts of an example fulfillment process 900 of FIG. 9 and an example fulfillment process 1000 of FIG. 10.

At operation 405, an inventory item may be listed on an online listing system based on attributes corresponding with the inventory item. Inventory may be configured within a retail management system. The inventory quantity of a SKU (e.g., an inventory item), quantity, weights, size, etc. may be attributes of the SKU stored within the retail management system. Identifying if a SKU is capable of being shipped from a retail store may be an additional attribute of the SKU stored in the retail management system that may allow a retail store to configure inventory that is available for shipment from the retail store's inventory. For example, a computer mouse may have an attribute SFS enabled=Y which may designate that the computer mouse is enabled to ship from a retail store. The capable of being shipped from a store attribute may be utilized in product sourcing decisions. In some example embodiments, items ordered online, but selected for pick up from a retail store may not use SFS enabled inventory.

A limited quantity of inventory may be made available for sale outside the retail store. For example, inventory items that are scarce and have a high demand may be reserved for sale in the retail store thereby giving preference to in-store shoppers over online shoppers. The SKU may have an SFS drop days attribute representing the quantity of days from when the item's street date (e.g., available for in-store purchase) is to when the item is available for fulfillment from the retail store. For example, a product that has an SFS enabled=Y attribute and an SFS drop days attribute of 7 may enable inventory of the product to be sourced from the retail store 7 days after the product's street date. This may ensure that the retail store has sufficient inventory to for in-store sales of an item in high demand the week it is made available to the public. In another example, a product may have an SFS drop days attribute of −2 that may enable the product to be sourced from the retail store 2 days before the street date.

At operation 410, the inventory item may be added to a pre-order list. For example, a customer may add 1 computer mouse to an electronic shopping cart such as the electronic shopping cart 305 described in FIG. 3.

At operation 415, the pre-order list may be converted to an order. For example, the user may have completed a purchase transaction to purchase the computer mouse in the electronic shopping cart.

At operation 420, inventory items in the order list may be sourced. For example, the computer mouse may be found in the inventory of a distribution center of retail store of a retailer. An example of the sourcing process is described in more detail in the sourcing workflow 800 of FIG. 8.

At operation 425, the inventory item may be released to a source for fulfillment. For example, the order for the computer mouse may be released to a retail store near the delivery location of the customer.

At operation 430, the inventory item may be shipped. Examples of the fulfillment process are described in more detail in the fulfillment workflow 900 of FIG. 9 and the fulfillment workflow 1000 of FIG. 10.

Figure 5:
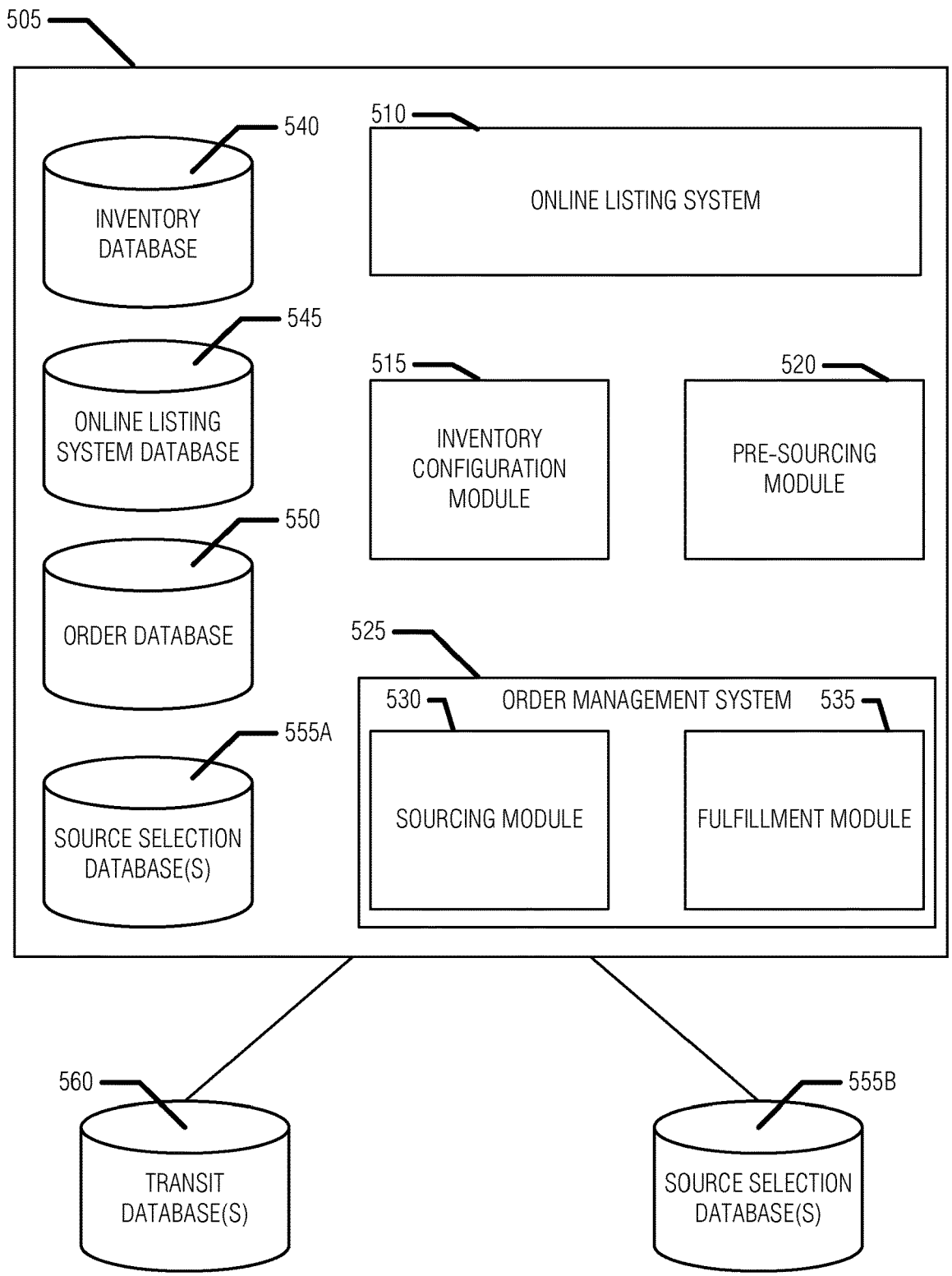
FIG. 5 illustrates an example system for a product sourcing and fulfillment workflow according to an example described herein.

FIG. 5 illustrates an example system 500 for a product sourcing and fulfillment workflow according to an example described herein. The system 500 may include an online listing system 510, an inventory configuration module 515, a pre-sourcing module 520, and an order management system 525. The order management system 525 may include a sourcing module 530 and a fulfillment module 535. The system 500 may access data from several databases including internal databases such as inventory database 540, online listing system database 545, order database 550, and source selection database(s) 555A. The system 500 may also access external databases such as transit database(s) 560 and source selection database(s) 555B. Each element of the system 500 may be implemented individually or in combination in one or more physical or virtual machines (e.g., physical server(s), virtual server(s) running on physical host(s), cloud-based computing platforms, etc.).

The online listing system 510 may provide a listing of products for sale by a retailer as described in FIG. 1. The online listing system may include the ability to create pre-order lists such as the electronic shopping cart 305 as described in FIG. 3. The online listing system may also use the pre-sourcing data described in the example pre-sourcing workflow 700 of FIG. 7.

The inventory configuration module 515 may process inventory data to determine which items are available to the online listing system 510. The inventory configuration module stores, in a database (e.g., inventory database 540), information about an item corresponding to a plurality of fulfillment locations, the information including a plurality of transit times and a plurality of transit costs corresponding to each of the plurality of transit times. In an example, the information about an item corresponding to the plurality of fulfillment locations includes an availability adjustment attribute corresponding to the item and each fulfillment location of the plurality of fulfillment locations, a floor attribute corresponding to the item and each fulfillment location of the plurality of fulfillment locations, and a threshold attribute corresponding to the item and each fulfillment location of the plurality of fulfillment locations. In an example embodiment, the inventory configuration module 515 may implement the example inventory control workflow 600 as described in FIG. 6.

The pre-sourcing module 520 may process inventory data and pre-order data to determine transit times and transit costs to be provided to the online listing system 510. For example, pre-sourcing module 520 may generate the transit times and costs 320A in FIG. 3. The pre-sourcing module 520 receives a location of a user; displays, in a user interface (e.g., a user interface of the online listing system 510), in response to receiving the location of the user, a subset of transit times from the plurality of transit times; displays, in the user interface, a subset of transit costs from the plurality of transit costs, the subset of transit costs corresponding with the subset of transit times; and receives an indication of a selection of a transit time of the subset of transit times, the indication including the item, a quantity of the item, and a destination.

In an example, the pre-sourcing module 520 determines an in-stock date attribute; calculates an available date using the in-stock date attribute and the availability adjustment attribute; and displays, on the user interface, the subset of transit times using the available date. In an example, the pre-sourcing module 520 determines a total quantity of the item for each fulfillment location of the plurality of fulfillment locations; calculates an above-floor quantity for the item using the total quantity and the floor attribute; and displays, on the user interface, the subset of transit times using the above-floor quantity. In an example, the pre-sourcing module 520 determines a total quantity of the item for the subset of fulfillment locations; calculates an above-threshold quantity for the item using the total quantity and the threshold attribute; and displays, on the user interface, the subset of transit times using the above-threshold quantity. In an example, the pre-sourcing module 520 determines a capacity attribute of a fulfillment location of the plurality of fulfillment locations, determines a current order quantity of the fulfillment location, calculates and a capacity score, and selects the fulfillment location for addition to the subset of fulfillment locations using the capacity score.

In an example, the pre-sourcing module 520 decrements a total quantity of the item included in the information about the item corresponding to a fulfillment location of the plurality of fulfillment locations using the quantity of the item.

Figure 7:
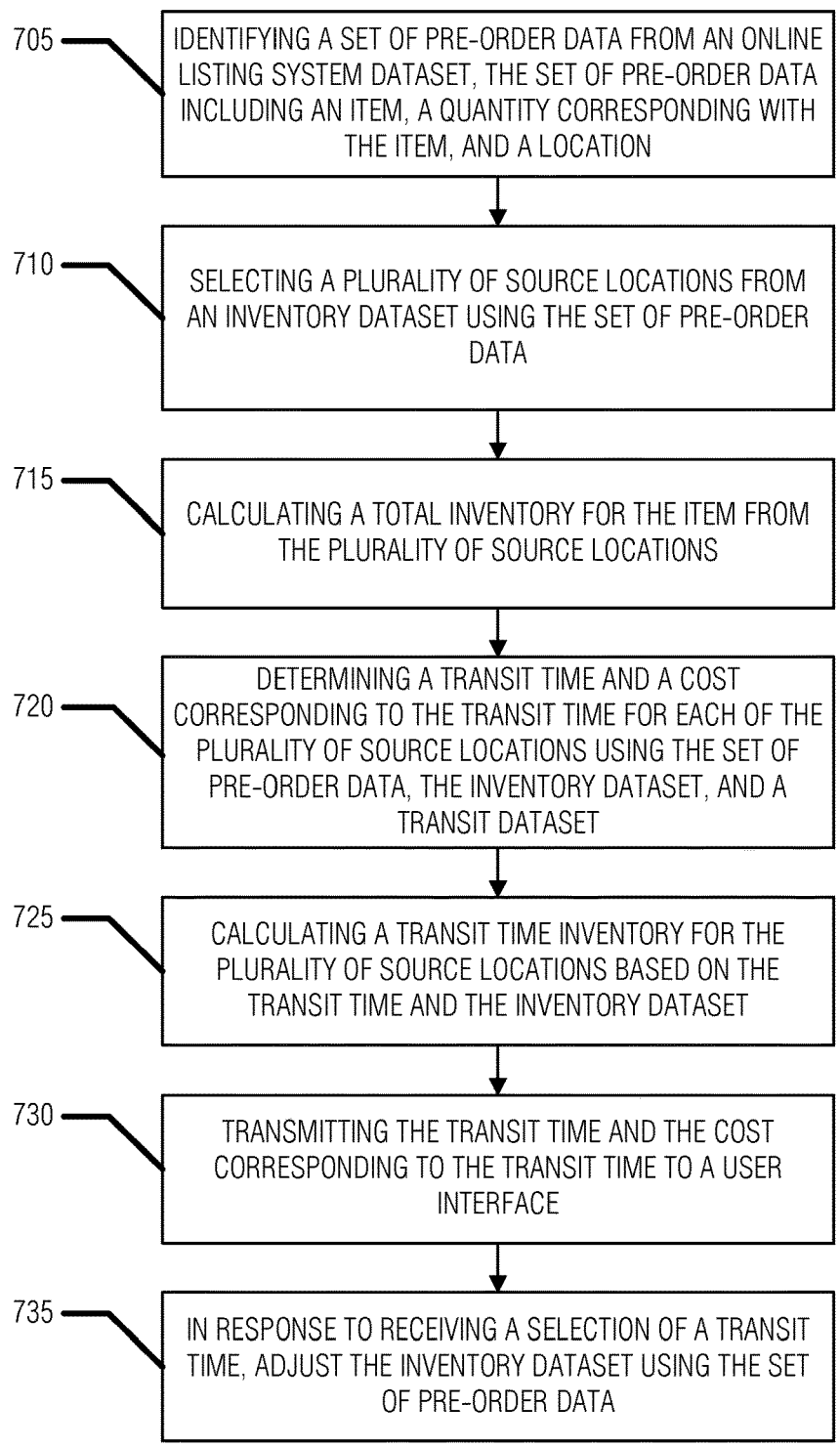
FIG. 7 illustrates an example method for a pre-sourcing workflow according to an example described herein.

In an example embodiment, the pre-sourcing module 520 may implement the example pre-sourcing workflow 700 as described in FIG. 7. In some example embodiments, a clipper system may collect zip codes and store them with corresponding SKUs. An aggregator may then collect transit times and costs for the zip codes and store them with the corresponding SKUs. Using pre-staged data may decrease the processing time for the pre-sourcing module 520. The pre-staged data may be refreshed near real-time and in batches at near real-time to keep the data up-to-date.

The order management system 525 may process order data, inventory data, transit data, and source selection data utilizing the sourcing module 530 to source inventory items corresponding with an order and the fulfillment module to facilitate packaging and transfer of the inventory items to a transit carrier. The order management system 525 calculates, in response to receiving the indication from the electronic commerce system, a preferred fulfillment location of a subset of fulfillment locations of the plurality of fulfillment locations corresponding to the subset of transit times, the calculating using the transit time, the location, and a selection rule, wherein the selection rule is generated using a plurality of selection attributes. In an example, the order management system 525 transmits, to the preferred fulfillment location, a request to send the quantity of the item to the destination. In an example, the order management system 525 receives a rejection response to the request from the preferred fulfillment location, and calculates, in response to the rejection response, using the transit time, the location, and the selection rule, a second preferred fulfillment location of the subset of fulfillment locations, the preferred fulfillment location removed from the subset of fulfillment locations.

In some example embodiments, the order management system 525, for example using the sourcing module 530 or the fulfillment module 535, may dynamically adjust the transit method selected to meet the selected transit time. For example, an order may be shipped via ground transit service even though a customer selected next day shipping if the source location is found close enough to the customer to arrive by the estimated arrival date resulting in a cost savings for the retailer. In an example, an order may be shipped via next day transit service even though a customer selected 3 day shipping if the source location is too far from the customer to arrive by the estimated arrival date or due to increased processing times resulting in the retailer meeting the customer's expectation of order arrival.

Figure 9:
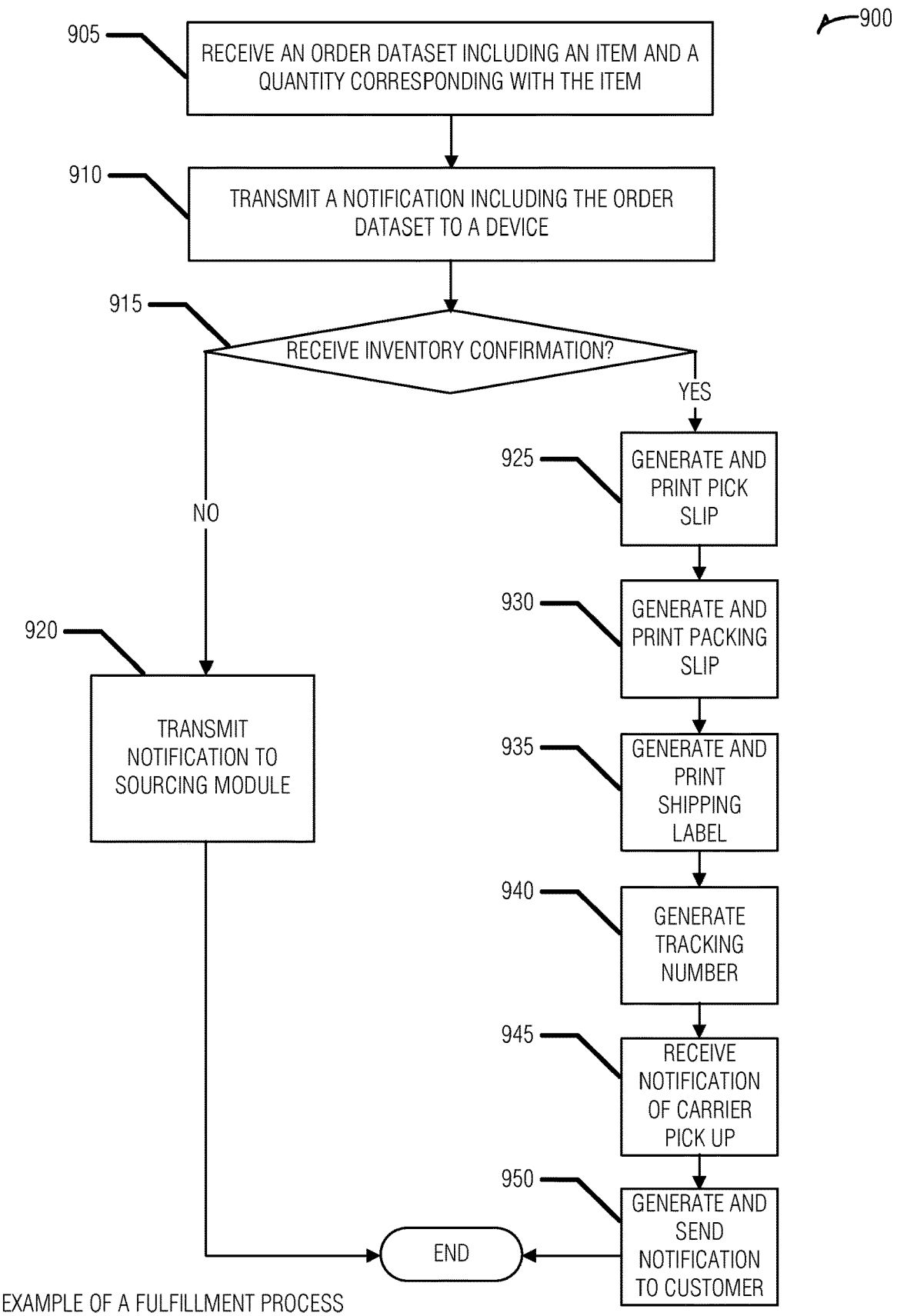
FIG. 9 illustrates an example of procedures for processing order data in a fulfillment workflow according to an example described herein.
Figure 10:
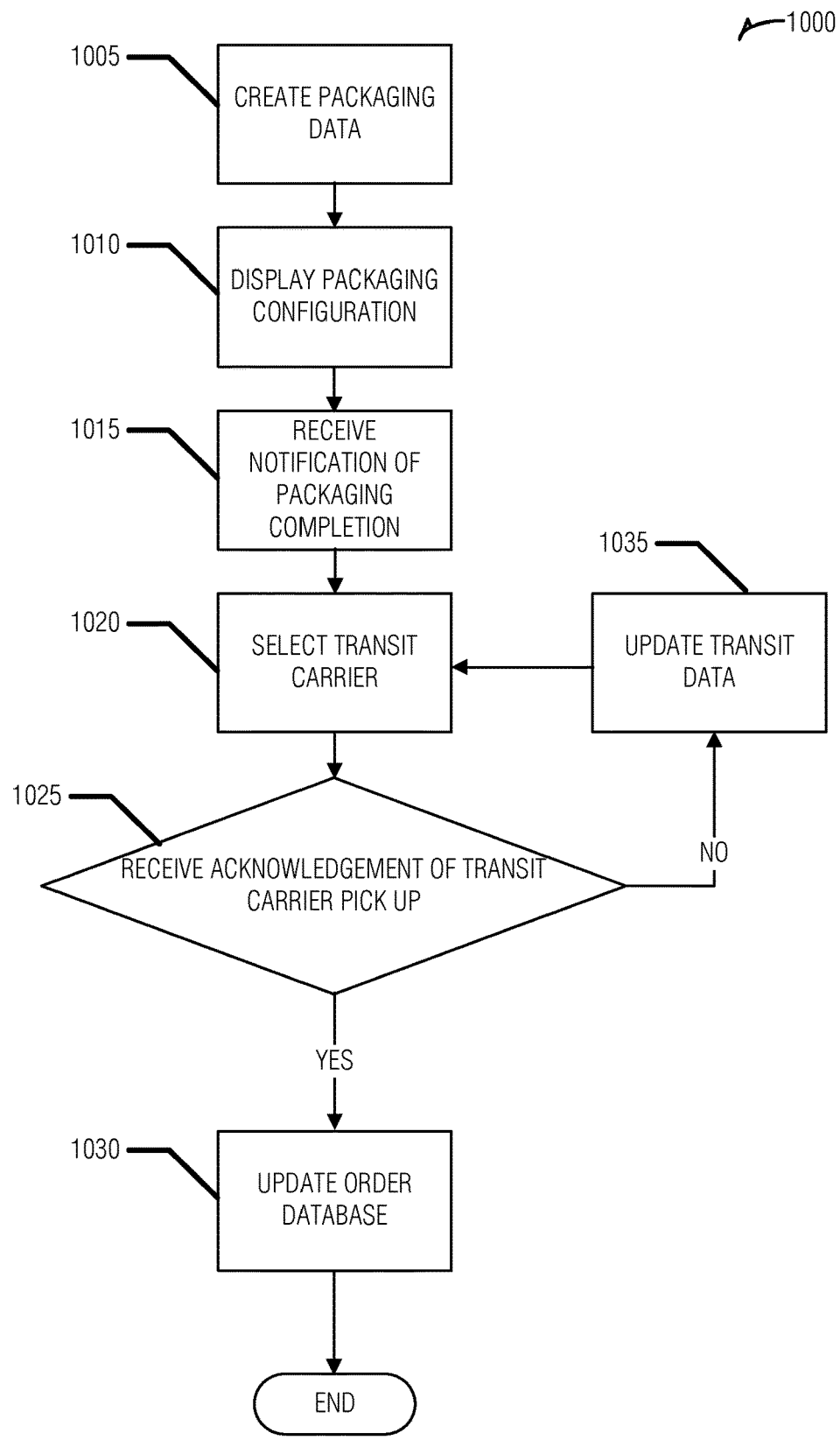
FIG. 10 illustrates an example of procedures for processing packaging and transit data in a fulfillment workflow according to an example described herein.

In an example embodiment, the order management system 525 may implement the example fulfillment workflow 900 of FIG. 9 and the example fulfillment workflow 1000 of FIG. 10.

Inventory Configuration

Figure 6:
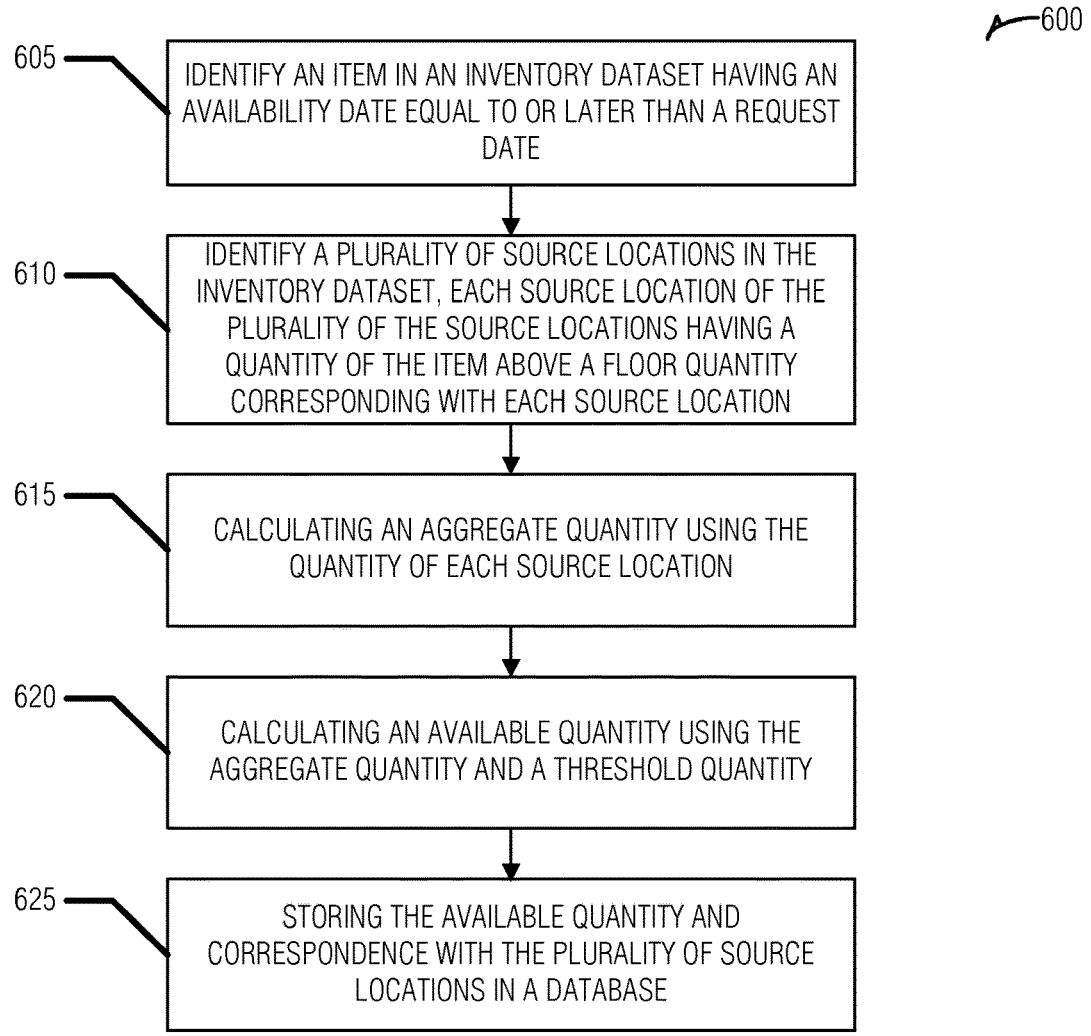
FIG. 6 illustrates an example method for an inventory configuration workflow according to an example described herein.

FIG. 6 illustrates an example method for an inventory configuration workflow 600 according to an example described herein. Inventory may be configured within a retail management system. The inventory quantity of a SKU (e.g., an inventory item), quantity, weights, size, etc. may be attributes of the SKU stored within the retail management system. Identifying if a SKU is capable of being shipped from a retail store may be an additional attribute of the SKU stored in the retail management system that may allow a retail store to configure inventory that is available for shipment from the retail store's inventory. For example, a computer mouse may have an attribute SFS enabled=Y which may designate that the computer mouse is enabled to ship from a retail store. The capable of being shipped from a store attribute may be utilized in product sourcing decisions.

A limited quantity of inventory may be made available for sale outside the retail store. For example, inventory items that are scarce and have a high demand may be reserved for sale in the retail store thereby giving preference to in-store shoppers over online shoppers.

At operation 605, an item in an inventory dataset having an availability date equal to or later than a request date may be identified. For example, the SKU may have an SFS drop days attribute representing the quantity of days from when the item's street date (e.g., available for in-store purchase) is to when the item is available for fulfillment from the retail store. For example, a product that has and SFS enabled=Y attribute and an SFS drop days attribute of 7 may enable inventory of the product to be sourced from the retail store 7 days after the product's street date. This may ensure that the retail store has sufficient inventory to for in-store sales of an item in high demand the week it is made available to the public. In another example, a product may have an SFS drop days attribute of −2 that may enable the product to be sourced from the retail store 2 days before the street date.

At operation 610, a plurality of source locations in the inventory dataset may be identified. Each of the source locations of the plurality of source locations has a quantity of the item above a floor quantity. A source location (e.g., a retail store) may have a floor quantity for the item representing a quantity of the item below which the source location's inventory may be reserved for in-store sales. For example, if a fashion retailer set a floor of 5 for a specific garment SKU and has 7 of the SKU on-hand, the store may have inventory 7-5, or 2, of the SKU available for sale outside the store. In the example, if the fashion retailer sells 3 of the SKU leaving the inventory for the SKU at 4, and below the floor, the remaining 4 units of the SKU may be reserved for sale in-store. There may be several types of floors employed for several different purposes. For example, a floor may be implemented based on a regulatory rule requiring a certain quantity of items to be on-hand for an advertised sale (e.g., advertised minimum quantities, etc.). For example, a floor may be set to reserve certain quantity of items for in-store pre-orders.

At operation 615, an aggregated quantity is calculated using the quantity of each of the source locations. In an example, the quantity of the item above the floor quantity of each source location may be summed to calculate the aggregated quantity. For example, retail stores A, B, C, D, and E may have 20, 14, 11, 58 and 62 computer mouse units on-hand, respectively. In the example, retail stores A, B, C, D, and E may have floor quantities of 5, 5, 5, 10 and 5, respectively. In the example, retail stores A, B, C, D, and E may quantities above the floor quantity of 15, 9, 6, 48 and 57, respectively, for a combined total of 135 units of the computer mouse above the respective floor quantities.

At operation 620, an available quantity is calculated using the aggregated quantity and a threshold quantity. The threshold quantity may be a quantity of an item reserved for in-store sales for a group of source locations. The threshold quantity may be a measure to ensure optimal inventory availability. For example, retail stores A, B, C, D, and E may quantities above the floor quantity of 15, 9, 6, 48 and 57, respectively, for a combined total of 135 units of the computer mouse above the respective floor quantities. In the example, the threshold for the group of stores including retail stores A, B, C, D, and E may be 40 units of the computer mouse making the available quantity for sale outside the retail stores 95. In the example, the threshold of 40 may be subtracted from the aggregate quantity of 135 to calculate an available quantity of 95 computer mouse units.

Inventory quantities may be constantly changing due to in-store sales, replenishment, item returns, etc. The dynamic change in inventory may result in an item being available from a source location one day and not the next day.

At operation 625, the available quantity and correspondence with the plurality of source locations is stored in a database. In an example, the database may be an inventory database. In an example, the database may be a database of a retail management system. In an example, the available quantity may be listed on an online listing system.

Pre-Sourcing

FIG. 7 illustrates an example method for a pre-sourcing workflow 700 according to an example described herein. Knowing where inventory is located may help set customer expectations for when an order may arrive. For example, a computer mouse that is available to be shipped from a store within 20 miles of the customer may have an expected arrival of 3 days. In another example, a computer mouse available to be shipped from a source location 2000 miles from the customer may have an expected arrival of 8 days. The variation in expected arrival dates may be the result of increased transit times. Pre-sourcing the item may show quantities of an item available at differing expected arrival dates. The inventory available for shipping to a customer's location may differ based on each expected arrival date.

Pre-sourcing may help to ensure that the retailer is able to meet the order arrival expectations of the customer by calculating the inventory that is available to meet arrival expectation dates. For example, there may be a total available quantity of a computer mouse available for shipping to zip code 90036. In the example, 15 units of the computer mouse may be 2-day inventory for zip code 90036, 5 units of the computer mouse may be next day inventory for zip code 90036, and 2 units of the computer mouse may be same day inventory for zip code 90036. Pre-sourcing data provides the customer with the fastest and lowest cost shipping options available for a potential order.

At operation 705, a set of pre-order data may be identified from an online listing system dataset. The set of pre-order data may include an item, a quantity corresponding with the item, and a location. In an example, the per-order data may be a subset of the online listing system dataset retrieved from a database communicatively coupled to the online listing system. For example, a customer with a zip code of 55409 may have placed a quantity of 1 computer mouse in an electronic shopping cart of a retailer's e-commerce system.

At operation 710, a plurality of source locations may be selected from an inventory dataset using the set of pre-order data. In an example, the inventory dataset may be a selection of data retrieved from an inventory database communicatively coupled to a retail management system. In an example, the selection of the plurality of source locations may use the data created by the inventory configuration workflow 600 described in FIG. 6.

At operation 715, a total inventory for the item may be calculated from the plurality of source locations. In an example, the total inventory may be a sum of an available inventory of each source location of the plurality of source locations.

At operation 720, a transit time and a cost corresponding with the transit time may be determined for each of the plurality of source locations using the set of pre-order data, the inventory dataset, and a transit dataset. In an example, the transit dataset may be retrieved from one or more database of one or more transit carrier including data used to calculate transit times and transit costs between the customer location in the set of pre-order data and the each source location of the plurality of source locations in the inventory dataset.

At operation 725, a transit time inventory may be calculated for the plurality of source locations based on the transit time and the inventory dataset. In an example, calculating the transit time inventory for the plurality of source locations may include sorting each source location of the plurality of source locations by transit time between the customer and each source location. In some example embodiments, the inventory may be stored with pre-calculated transit times and the transit time inventory is calculated from the stored inventory data. In an example, the stored inventory and transit time data is refreshed near real-time.

At operation 730, the transit time and the cost corresponding with the transit time may be transmitted to a user interface. In an example, the user interface may be a web user interface displayed by the online listing system. In some example embodiments, the transit time and cost may be displayed in a detail page for an item listed in the retailer's e-commerce system and the electronic shopping cart of the retailer's e-commerce system as shown in elements 320A and 320B of FIG. 3.

At operation 735, the inventory dataset may be adjusted using the set of pre-order data in response to receiving a selection of a transit time. In an example, the transit time quantity may be decremented by the quantity of the item included in the pre-order data. In an example, the inventory of a source location of the plurality of source locations providing at least one of the transit inventory quantity may be reduced by the quantity corresponding to the item. In an example, the source location having its inventory reduced may be selected based on order capacity or other selection attributes.

The customer may convert the set of pre-order data to a set of order data by completing a purchase transaction. The conversion of the set of pre-order data to the set of order data may cause the pre-sourcing data to be sent to an order management system. Items may be removed from the set of pre-order data before the set of pre-order data is converted to the set of order data. For example, the customer may remove an item from an electronic shopping cart or the customer's electronic shopping cart session may expire. The inventory data set may be adjusted using the change in the set of pre-order data. For example, the transit time inventory of the inventory dataset may be incremented by 1 unit of the computer mouse upon removal of a quantity of 1 computer mouse from the customer's electronic shopping cart.

Sourcing

Figure 8:
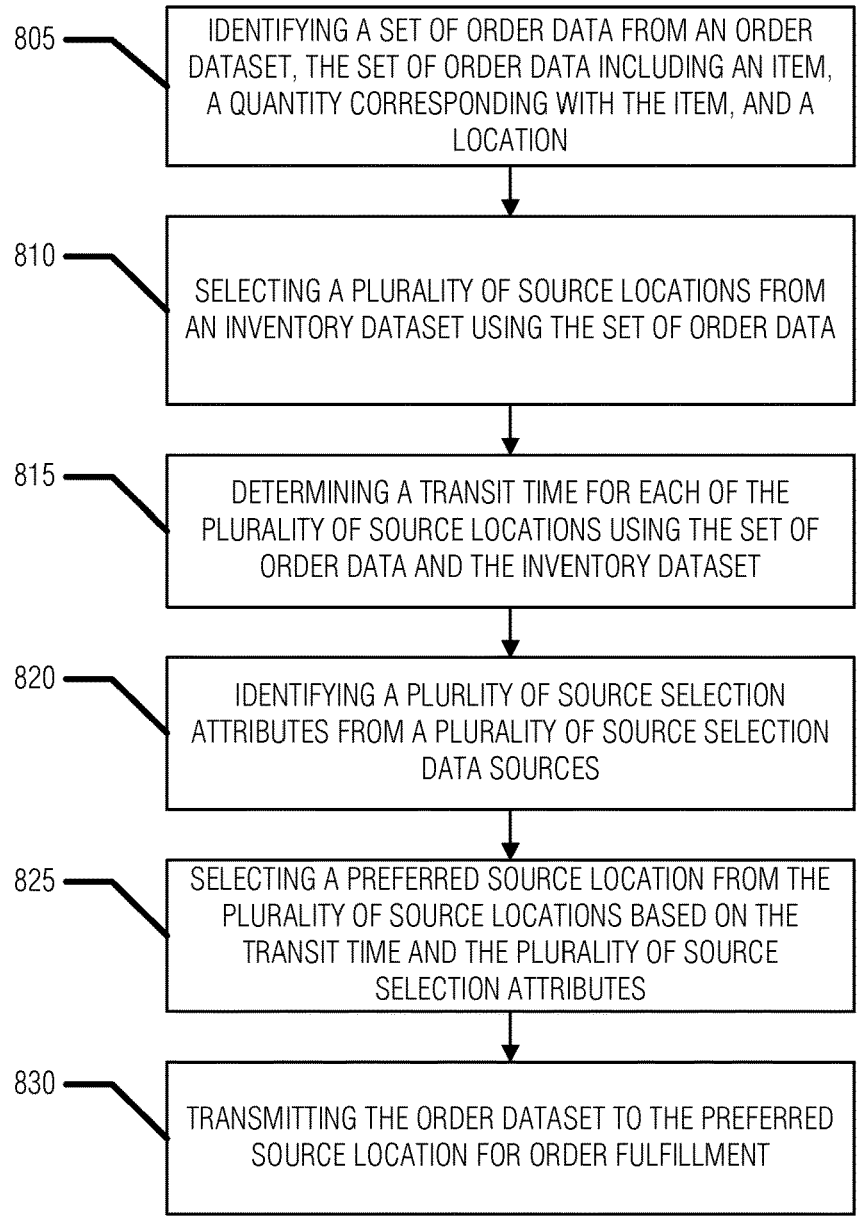
FIG. 8 illustrates an example method for a sourcing workflow according to an example described herein.

FIG. 8 illustrates an example method for a sourcing workflow 800 according to an example described herein. In some examples, the data produced during the pre-sourcing workflow 700 as described in FIG. 7 may be used by the sourcing workflow 800. An order management system such as order management system 525 in FIG. 5 may process orders and source to a fulfillment location (e.g., a retail store, distribution center, third party, etc.) which may meet an arrival date expectation of the customer. For example, a customer expects a computer mouse to arrive in 3 days and the computer mouse is sourced from a location within a shipping zone with a transit time of 3 days or less. Sourcing provides the retailer with the lowest cost option for meeting the transit time selected by the customer.

At operation 805, a set of order data may be identified from an order dataset. The set of order data may include an item, a quantity corresponding with the item, a transit time, and a location. For example, a customer's order may include 1 computer mouse for 2-day shipping to zip code 55409.

At operation 810, a plurality of source locations may be selected from an inventory database using the set of order data. For example, retail stores A, B, C, D, and E may be selected as each has at least 1 computer mouse available for shipping from the store.

At operation 815, a transit time may be determined for each of the plurality of source locations using the set of order data and the inventory dataset. For example, retail stores A, B, C, D, and E may be determined to have transit times to zip code 55409 of 1 day, 2 days, 2 days, 5 days, and 8 days, respectively.

At operation 820, a plurality of source selection attributes may be identified from a plurality of source selection data sources. Sourcing from a preferred location may include a series of selection rules or "tie-breakers." The selection rules may use the plurality of source selection attributes to select the preferred source location. The selection rules may be dynamically configured based on many factors. By way of example and not limitation, some of the source selection attributes may include:

- Ability to Meet Customer Delivery Expectation: sourcing orders to locations which can deliver to the customer in time is essential. Several distribution centers and stores may meet this criterion.
- Distance from Customer (in miles): To narrow the list of locations further, identifying the distance in miles from the customer provides further differentiation of location. Locations with a high mileage total from the customer are deprioritized.
- Units on Hand Beneath Replenishment Level: Unit replenishment may be an important retail operation. Inventory is planned based on demand velocity. Replenishment occurs to ensure units are in stock based on forecasted and actual demand. For locations closest to their level of replenishment (read: maximum assigned units on hand), the location is prioritized.
- Location Rank: A manual scoring of locations can give the sourcing engine further guidance of which locations to favor.
- Location Cutoff Time: If the order is assigned to a location after the location's cutoff time, the location is deprioritized.
- Ability to configure systemic cutoff's by groupings of locations based on zip to zip transit information. This drives the inventory availability of product by level of service and dynamically recalculates the inventory position based on the cutoffs.
- Ability to Fill Complete Order: To increase the overall customer experience, it may be preferable for all items within the order to arrive within the same package and at the same time. Locations with all the items to fill the complete order are prioritized.
- SKU Status: SKUs may be marked as Clearance or End of Life. With this status, removing the inventory from stores is preferred to clear space for new inventory. SKUs with such status are prioritized to be sourced to stores above distribution centers.
- Store Status: Some SKUs may be marked for clearance and/or deletion from the store's planogram while other stores will keep the SKU as Active. Sourcing is aware of this management decision and stores with deletion status are prioritized.
- Pick Success Rate: Some stores have great success with finding inventory while other stores may have challenges. Stores with a greater success rate are prioritized in sourcing to ensure avoidable delays are minimized with sourcing and shipping the order.
- A process by which to escalate orders at risk of not meeting the delivery date commitment.
- Store order capacity: Stores may have a maximum order capacity (e.g., 100 orders per day). A store below maximum order capacity may be preferred to a store at or above maximum order capacity. In situations where the store at or above maximum order capacity has the last remaining inventory for the item the preference may be disregarded.
- Labor cost: A store with a lower labor cost may be prioritized over a store with a higher labor cost.

At operation 825, a preferred source location may be selected from the plurality of source locations based on the transit time and the plurality of source selection attributes. For example, retail stores A, B, and C may be able to meet the 2-day transit time and retail store A may be selected because the computer mouse has the store status of deletion for retail store A.

At operation 830, the order dataset may be transmitted to the preferred source location for order fulfillment. For example, retail store A may be sent the order for 1 computer mouse to be shipped to the customer at zip code 55409 via 2 day shipping.

Fulfillment

FIG. 9 illustrates an example of procedures for processing order data in a fulfillment workflow 900 according to an example described herein. Picking and packing is a process by which a worker will receive an order, acknowledge or reject an item, order will be sorted and prioritized based on urgency criteria—such as a date of delivery commitment, transit service is selected based on the commitment date and dynamically selected to optimize costs.

A source location may receive an order from the online management system. The order may request inventory which is no longer available or cannot be found in a timely fashion. The workers attending to these orders may elect to "No-Pick" the order. A No-Pick may inform order management system that the order must be fulfilled by a different source location. The order management system may reevaluate the order and select a new preferred source location capable of meeting the customer's delivery date expectation.

No-Picks also may automatically be generated by the OMS for a lack of a timely response was given by the assigned fulfillment location. If an order has not been attended to for an extended period of time, OMS will revoke the assignment from the fulfillment location and reassign without a worker intervening at the original fulfillment location.

At operation 905 an order dataset including an item and a quantity corresponding with the item may be received. For example a retail store may receive an order for 1 computer mouse.

At operation 910, a notification including the order dataset may be transmitted to a device. For example, a message may be displayed on the data terminal 108 or other control station of the retail store 104F described in FIG. 1.

At decision 915, it is determined if an inventory confirmation has been received. If no inventory confirmation is received at decision 915, at operation 920, a notification may be transmitted to the sourcing module 530 as described in FIG. 5. For example, the retail store may have sold the last computer mouse in-store and may not be able to confirm inventory. In another example, the store may be unable to send an inventory confirmation (e.g., network outage, lack of personnel, etc.). If an inventory confirmation is received at decision 915 the process continues at operation 925. For example, the retail store may acknowledge that there is a sufficient inventory of the computer mouse in-stock.

At operation 925, a pick slip may be generated and printed. For example, a label may be printed with information identifying the item to the order that an employee of the retail store may affix to a computer mouse from inventory to designate the product as part of a customer's order to be shipped.

At operation 930, a packing slip may be generated and printed. For example, a document may be printed identifying the customer, the order, and items of the order to be included in a shipment to the customer.

At operation 935, a shipping label may be generated and printed. In an example, generating the shipping label may include accessing one or more transit databases of one or more transit carriers. For example, several transit carrier transit data sources may be queried to determine and select a lowest cost transit carrier able to meet the transit time specified in the order and a shipping label including the shipment data may be printed and affixed to the package to be sent to the customer.

At operation 940, a tracking number may be generated. In an example, the tracking number may be generated based on information retrieved from the one or more transit databases. In an example, the tracking number may be added to the order dataset upon generation. For example, the when the transit carrier and level of service (e.g., guaranteed 2 day sipping, guaranteed next day shipping, etc.) are selected the tracking number may be generated corresponding to the transit data corresponding with the order.

At operation 945, a notification of carrier pickup may be received. In an example, the notification of carrier pickup may be added to the order dataset. In an example, the selected transit carrier may send a notification that the shipment has been received by the transit carrier (e.g., a barcode signifying the tracking number was scanned by an employee of the transit carrier when the package was loaded on a truck of the transit carrier) and when the notification is received the order dataset may be updated to include an indication that the package was shipped (e.g., the computer mouse for your order has shipped).

At operation 950, a notification may be generated and sent to a customer. For example, the customer may receive an email or short message service (SMS) message with a message such as "Your order of 1 computer mouse has shipped." In an example, the notification may include the order dataset.

In an example scenario, an employee of a retailer may be alerted to pick an item, pick the item, and pack the item. Pick as used herein, means to select an item of an order from on-hand stock in fulfillment of a customer's order. An order management system may send package data to a digital shipper. The digital shipper may upgrade or downgrade the shipping service level as needed to meet the transit time selected by the customer. For example, an order may be shipped via ground transit service even though a customer selected next day shipping if the source location is found close enough to the customer to arrive by the estimated arrival date resulting in a cost savings for the retailer. In an example, an order may be shipped via next day transit service even though a customer selected 3 day shipping if the source location is too far from the customer to arrive by the estimated arrival date or due to increased processing times resulting in the retailer meeting the customer's expectation of order arrival. The employee of the retailer may acknowledge pickup by the transit carrier and the order may be shipped.

In another example scenario, a pick message may be displayed to a user of an order management system (e.g., an employee of the retailer) in a user interface of the order management system. The user may print a backroom pick report and determine if a product is available or found in on-hand inventory. The user may select a "No Pick" user interface element of a backroom pick page of the user interface indicating that the product was not available or found in on-hand inventory. The user may pick from the backroom pick page if the product is found or available in on-hand inventory. The user may determine if the product to be picked is a ship from store item. If the product is not a ship from store item, the user may attach a pick slip and set the product in a staging area for pickup by the customer. If the product is a ship from store item, the user may attach a ship from store pick slip and set the product in a shipping staging area to be prepared for packaging.

FIG. 10 illustrates an example of procedures for processing packaging and transit data in a fulfillment workflow 1000 according to an example described herein.

At operation 1005, packaging data may be created. In an example, the packaging data may include the weight and size of each item of an order.

At operation 1010, packaging configuration may be displayed. In an example, the packaging data may be analyzed to determine a set of items to be placed in a package. For example, a television may be shipped in its original packaging while a computer mouse, keyboard, and smartphone case of the order may be combined into one package.

At operation 1015, notification of package completion may be received. For example, the user may click on a create package user interface icon indicating that the computer mouse, computer keyboard, and smartphone case have been placed in the package.

At operation 1020, a transit carrier may be selected. For example, several transit carrier transit data sources may be queried to determine and select a lowest cost transit carrier able to meet the transit time specified in the order.

At decision 1025, it may be determined if an acknowledgement of transit carrier pickup has been received. If an acknowledgement of transit carrier pickup has not been received the transit data will be updated at operation 1035 and the process resumes by selecting a transit carrier at operation 1020. If an acknowledgement of transit carrier pickup has been received the process continues at operation 1030. In an example, the selected transit carrier may send a notification that the shipment has been received by the transit carrier (e.g., a barcode signifying the tracking number was scanned by an employee of the transit carrier when the package was loaded on a truck of the transit carrier).

At operation 1030, an order database is updated. For example, the order database may be updated to include an indication that the package and corresponding items were shipped.

In an example scenario, a user may access a shipment prep/pack screen of a user interface displayed by the user management system. The user may select an order by priority option of the user interface. The user may be directed to a create package screen of the user interface. If the user determines packaging materials are not available to package the item, the user may select a no pick user interface element of the user interface and a notification may be sent to the order management system that inventory is not available for the item at the source location and the user may then determine if there are other items in the order. The order may contain multiple items and the process may be repeated until it has been determined whether there are packaging materials available for each item of the order.

If there are packing materials available for some, but not all items in the order, the order may include a partial pack. If the user determines packaging materials are available to package the item the user may scan or key in the item until all items have been placed in the package or until the package is full. The user may then select a create package element of a user interface of the order management system. The pack lip tracking number and shipping label may be generated. The packing slip and shipping label may be printed. A message may be sent to the user that the pack slip and shipping label have printed and carrier and level of service may have change may be displayed in the user interface of the order management system.

It may be determined whether the tracking number is mail innovations. If so, the tracking number may be truncated. Transit carrier data may be updated to the order management database. Order lines on the order may be updated from "packing item for shipment—SFS" to "awaiting carrier pickup." An option to reprint the pack slip and shipping label may be displayed in the user interface which upon selection may cause the pack slip and/or shipping label to print.

The user may determine if a package may be unpackaged. If so, the user may select an unpack package option of the user interface. The items may be unpacked and the user may be directed to the create package/packages detail screen of the user interface. The order management system may move the order line to preparing item for shipment status and remove the tracking number from the shipment. The package may not be unpacked in which case it may be determined if there are additional units to pack on the package detail. A package may be full and additional item remain in the order and the process may repeat by continuing at determining if the order contains a partial pack.

The user interface may display shipments with awaiting carrier pickup status. The user interface may provide the user another opportunity to unpack the package, reprint the packing slip, or reprint the shipping label as described above. The user may set all packages in a staging area for transit carrier pickup. The user may print an awaiting carrier pickup report to count or reconcile packages in the staging area.

The user may confirm that all packages can fit on the truck of the transit carrier. The user may determine whether a package may be held of released. The user may select packages to be held or released from hold. The user may submit shipments to be updated by selecting a hold/unhold user interface element of the user interface. The transit carrier may update status. The order management system may update status and refresh the user interface to reflect package on hold or ready to acknowledge. The user may set a held package aside for next eligible carrier pickup and at the next carrier pick up the process will continue at confirming the packages may fit on the truck of the transit carrier.

For items not held, the user may acknowledge pickups at the time of pickup. The transit carrier may close the shipment, retrieve a summary barcode, and transmit PLD. The summary barcode may print. The order management system may update the order lines to "Shipped." A message may be displayed in the user interface that the summary barcode(s) have printed. The user may be presented an option to reprint the summary barcode which when selected reprints the summary barcode. The user may provide the summary barcode to the transit carrier driver to scan and sign. The transit carrier driver may sign and provide the summary barcode back to the user. The user may store the summary barcode.

Figure 11:
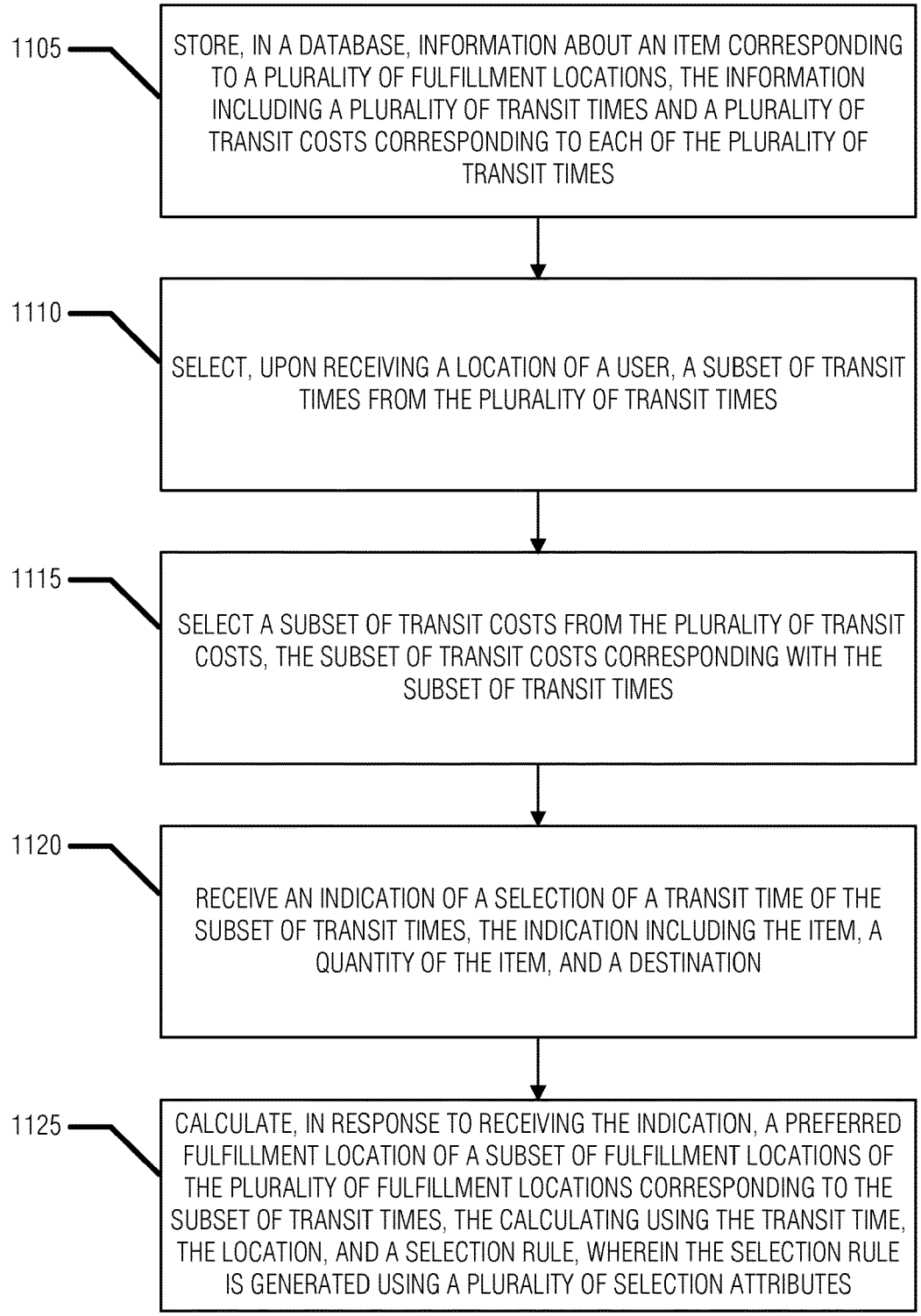
FIG. 11 illustrates an example method for demand-based product sourcing according to an example described herein.

FIG. 11 illustrates an example method 1100 for demand-based product sourcing according to an example described herein.

At operation 1105, information about an item corresponding to a plurality of fulfillment locations, the information including a plurality of transit times and a plurality of transit costs corresponding to each of the plurality of transit times is stored in a database. In an example, the information about an item corresponding to the plurality of fulfillment locations includes an availability adjustment attribute corresponding to the item and each fulfillment location of the plurality of fulfillment locations. In an example, the information about an item corresponding to the plurality of fulfillment locations includes a floor attribute corresponding to the item and each fulfillment location of the plurality of fulfillment locations. In an example, the information about an item corresponding to the plurality of fulfillment locations includes a threshold attribute corresponding to the item and each fulfillment location of the plurality of fulfillment locations.

At operation 1110, a subset of transit times from the plurality of transit times are selected upon receiving a location of a user. In an example, selecting the subset of transit times from the plurality of transit times comprises determining an in-stock date attribute; calculating an available date using the in-stock date attribute and the availability adjustment attribute; and selecting the subset of transit times using the available date.

In an example, selecting the subset of transit times from the plurality of transit times comprises determining a total quantity of the item for each fulfillment location of the plurality of fulfillment locations; calculating an above-floor quantity for the item using the total quantity and the floor attribute; and selecting the subset of transit times using the above-floor quantity.

In an example, selecting the subset of transit times from the plurality of transit times comprises determining a total quantity of the item for the subset of fulfillment locations; calculating an above-threshold quantity for the item using the total quantity and the threshold attribute; and selecting the subset of transit times using the above-threshold quantity.

At operation 1115, a subset of transit costs from the plurality of transit costs, the subset of transit costs corresponding with the subset of transit times are selected. In an example, the subset of transit times and the subset of transit costs corresponding with the subset of transit costs are displayed in correspondence of a subset of the information about the item in a user interface. In an example, the user interface is displayed on a website provided by a web server.

At operation 1120, an indication of a selection of a transit time of the subset of transit times, the indication including the item, a quantity of the item, and a destination is received. In an example, receiving the indication of the selection includes decrementing a total quantity of the item included in the information about the item corresponding to a fulfillment location of the plurality of fulfillment locations using the quantity of the item.

In an example, the selection of the transit time is received in response to a user selection of the transit time, the user selection of the transit time occurring from among the plurality of transit times in an electronic commerce user interface.

At operation 1125, a preferred fulfillment location of a subset of fulfillment locations of the plurality of fulfillment locations corresponding to the subset of transit times, the calculating using the transit time, the location, and a selection rule, wherein the selection rule is generated using a plurality of selection attributes is calculated in response to receiving the indication received at operation 1120.

In an example, the method 1100 further comprises transmitting, to the preferred fulfillment location, a request to send the quantity of the item to the destination. In an example, a rejection response to the request from the preferred fulfillment location may be received, the preferred fulfillment location may be removed from the subset of fulfillment locations, and, in response to the rejection response, a second preferred fulfillment location of the subset of fulfillment locations may be calculated using the transit time, the location, and the selection rule.

Embodiments used to facilitate and perform the techniques described herein may be implemented in one or a combination of hardware, firmware, and software. Embodiments may also be implemented as instructions stored on a machine-readable storage medium (e.g., a storage device), which may be read and executed by at least one processor to perform the operations described herein. A machine-readable storage medium may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Figure 12:
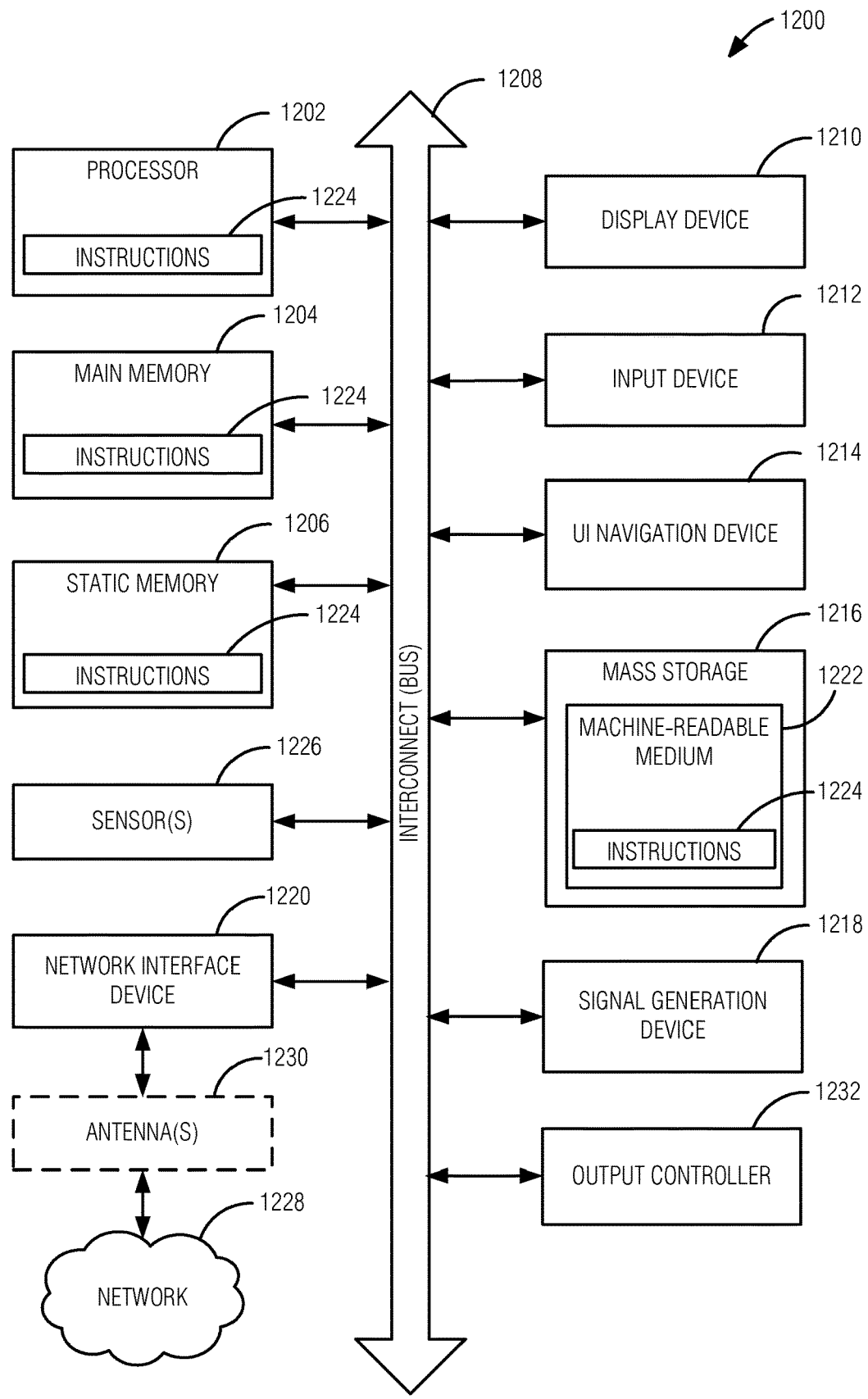
FIG. 12 is a block diagram illustrating operational components of a computing device upon which any one or more of the methodologies herein discussed may be run.

FIG. 12 illustrates a block diagram illustrating a machine in the example form of a computer system 1200, within which a set or sequence of instructions may be executed to cause the machine to perform any one of the methodologies discussed herein, according to an example. Computer system machine 1200 may be embodied by the electronic processing system 800; the subsystem(s) implementing the data stores 802, 804, 806, 808, 810; the subsystem(s) implementing the various modules or components 820, 830, 840, 850, 860, 870, 880, 890; the data terminal 108; the computer system for processing operations 202, 204, 206, 208, 210, 212; the data processing elements 410, 412, 414, 416, 420; or any other electronic processing or computing platform described or referred to herein.

Example computer system 1200 includes at least one processor 1202 (e.g., a central processing unit (CPU), a graphics processing unit (GPU) or both, processor cores, compute nodes, etc.), a main memory 1204 and a static memory 1206, which communicate with each other via an interconnect 1208 (e.g., a link, a bus, etc.). The computer system 1200 may further include a video display unit 1210, an alphanumeric input device 1212 (e.g., a keyboard), and a user interface (UI) navigation device 1214 (e.g., a mouse). In one example, the video display unit 1210, input device 1212 and UI navigation device 1214 are incorporated into a touchscreen interface and touchscreen display. The computer system 1200 may additionally include a storage device 1216 (e.g., a drive unit), a signal generation device 1218 (e.g., a speaker), an output controller 1232, a network interface device 1220 (which may include or operably communicate with one or more antennas 1230, transceivers, or other wireless communications hardware), and one or more sensors 1226, such as a global positioning system (GPS) sensor, compass, accelerometer, location sensor, or other sensor.

The storage device 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204, static memory 1206, and/or within the processor 1202 during execution thereof by the computer system 1200, with the main memory 1204, static memory 1206, and the processor 1202 also constituting machine-readable media.

While the machine-readable medium 1222 is illustrated in an example to be a single medium, the term "machine-readable medium" may include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 may further be transmitted or received over a communications network 1228 using a transmission medium via the network interface device 1220 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 includes subject matter (such as a method, means for performing acts, machine readable medium including instructions that when performed by a machine cause the machine to performs acts, or an apparatus to perform) comprising: storing, in a database, information about an item corresponding to a plurality of fulfillment locations, the information including a plurality of transit times and a plurality of transit costs corresponding to respective of the plurality of transit times; selecting, upon receiving a location of a user, a subset of transit times from the plurality of transit times; selecting a subset of transit costs from the plurality of transit costs, the subset of transit costs corresponding with the subset of transit times; receiving an indication of a selection of a transit time of the subset of transit times, the indication including the item, a quantity of the item, and a destination; and calculating, in response to receiving the indication, a preferred fulfillment location of a subset of fulfillment locations of the plurality of fulfillment locations corresponding to the subset of transit times, the calculating using the transit time, the location, and a selection rule, wherein the selection rule is generated using a plurality of selection attributes.

In Example 2, the subject matter of Example 1 may include, wherein the information about an item corresponding to the plurality of fulfillment locations includes an availability adjustment attribute corresponding to the item and respective fulfillment locations of the plurality of fulfillment locations.

In Example 3, the subject matter of any one of Examples 1 to 2 may include, wherein the selecting the subset of transit times comprises: determining an in-stock date attribute; calculating an available date using the in-stock date attribute and the availability adjustment attribute; and selecting the subset of transit times using the available date.

In Example 4, the subject matter of any one of Examples 1 to 3 may include, wherein the information about an item corresponding to the plurality of fulfillment locations includes a floor attribute corresponding to the item and respective fulfillment locations of the plurality of fulfillment locations.

In Example 5, the subject matter of any one of Examples 1 to 4 may include, wherein the selecting the subset of transit times comprises: determining a total quantity of the item for respective fulfillment locations of the plurality of fulfillment locations; calculating an above-floor quantity for the item using the total quantity and the floor attribute; and selecting the subset of transit times using the above-floor quantity.

In Example 6, the subject matter of any one of Examples 1 to 5 may include, wherein the information about an item corresponding to the plurality of fulfillment locations includes a threshold attribute corresponding to the item and respective fulfillment locations of the plurality of fulfillment locations.

In Example 7, the subject matter of any one of Examples 1 to 6 may include, wherein the selecting the subset of transit times comprises: determining a total quantity of the item for the subset of fulfillment locations; calculating an above-threshold quantity for the item using the total quantity and the threshold attribute; and selecting the subset of transit times using the above-threshold quantity.

In Example 8, the subject matter of any one of Examples 1 to 7 may include, wherein receiving the indication of the selection includes decrementing a total quantity of the item included in the information about the item corresponding to a fulfillment location of the plurality of fulfillment locations using the quantity of the item.

In Example 9, the subject matter of any one of Examples 1 to 8 may include, wherein the subset of transit times and the subset of transit costs corresponding with the subset of transit costs are displayed in correspondence of a subset of the information about the item in a user interface.

In Example 10, the subject matter of any one of Examples 1 to 9 may include, wherein the user interface is displayed on a website provided by a web server.

In Example 11, the subject matter of any one of Examples 1 to 10 may include, wherein the selection of the transit time is received in response to a user selection of the transit time, the user selection of the transit time occurring from among the plurality of transit times in an electronic commerce user interface.

In Example 12, the subject matter of any one of Examples 1 to 11 may include, further comprising: transmitting, to the preferred fulfillment location, a request to ship the quantity of the item to the destination.

In Example 13, the subject matter of any one of Examples 1 to 12 may include, further comprising: receiving a rejection response to the request from the preferred fulfillment location; removing the preferred fulfillment location from the subset of fulfillment locations; and calculating, in response to the rejection response, using the transit time, the location, and the selection rule, a second preferred fulfillment location of the subset of fulfillment locations.

Example 14 includes subject matter (such as a device, apparatus, or machine) comprising: at least one processor; at least one computer-readable storage medium; an inventory configuration system implemented using the at least one processor and the at least one computer-readable storage medium, the at least one computer-readable storage medium including a first set of instructions stored thereon which, when executed, cause the at least one processor to: store, in a database, information about an item corresponding to a plurality of fulfillment locations, the information including a plurality of transit times and a plurality of transit costs corresponding to respective of the plurality of transit times; an electronic pre-sourcing system implemented using the at least one processor and the at least one computer-readable storage medium, the at least one computer-readable storage medium including a second set of instructions stored thereon which, when executed, cause the at least one processor to: receive a location of a user, display, in a user interface, in response to receiving the location of the user, a subset of transit times from the plurality of transit times, display, in the user interface, a subset of transit costs from the plurality of transit costs, the subset of transit costs corresponding with the subset of transit times, and receive an indication of a selection of a transit time of the subset of transit times, the indication including the item, a quantity of the item, and a destination; and an order management system implemented using the at least one processor and the at least one computer-readable storage medium, the at least one computer-readable storage medium including a third set of instructions stored thereon which, when executed, cause the at least one processor to: calculate, in response to receiving the indication from the electronic commerce system, a preferred fulfillment location of a subset of fulfillment locations of the plurality of fulfillment locations corresponding to the subset of transit times, the calculating using the transit time, the location, and a selection rule, wherein the selection rule is generated using a plurality of selection attributes.

In Example 15, the subject matter of Example 14 may include, wherein the information about an item corresponding to the plurality of fulfillment locations includes an availability adjustment attribute corresponding to the item and respective fulfillment locations of the plurality of fulfillment locations.

In Example 16, the subject matter of any one of Examples 14 to 15 may include, the second set of instructions for the electronic pre-sourcing system further including instructions to: determine an in-stock date attribute; calculate an available date using the in-stock date attribute and the availability adjustment attribute; and display, on the user interface of the electronic pre-sourcing system, the subset of transit times using the available date.

In Example 17, the subject matter of any one of Examples 14 to 16 may include, wherein the information about an item corresponding to the plurality of fulfillment locations includes a floor attribute corresponding to the item and respective fulfillment locations of the plurality of fulfillment locations.

In Example 18, the subject matter of any one of Examples 14 to 17 may include, the second set of instructions for the electronic pre-sourcing system further including instructions to: determine a total quantity of the item for respective fulfillment locations of the plurality of fulfillment locations; calculate an above-floor quantity for the item using the total quantity and the floor attribute; and display, on the user interface of the electronic pre-sourcing system, the subset of transit times using the above-floor quantity.

In Example 19, the subject matter of any one of Examples 14 to 18 may include, wherein the information about an item corresponding to the plurality of fulfillment locations includes a threshold attribute corresponding to the item and respective fulfillment locations of the plurality of fulfillment locations.

In Example 20, the subject matter of any one of Examples 14 to 19 may include, the second set of instructions for the electronic pre-sourcing system further including instructions to: determine a total quantity of the item for the subset of fulfillment locations; calculate an above-threshold quantity for the item using the total quantity and the threshold attribute; and display, on the user interface of the electronic pre-sourcing system, the subset of transit times using the above-threshold quantity.

In Example 21, the subject matter of any one of Examples 14 to 20 may include, wherein the second set of instructions for the electronic pre-sourcing system to receive the indication of the selection includes instructions to decrement a total quantity of the item included in the information about the item corresponding to a fulfillment location of the plurality of fulfillment locations using the quantity of the item.

In Example 22, the subject matter of any one of Examples 14 to 21 may include, wherein the subset of transit times and the subset of transit costs corresponding with the subset of transit costs are displayed in correspondence of a subset of the information about the item in the user interface.

In Example 23, the subject matter of any one of Examples 14 to 22 may include, wherein the user interface is displayed on a website provided by a web server.

In Example 24, the subject matter of any one of Examples 14 to 23 may include, wherein indication of a selection of the transit time is received in response to a user selection of the transit time, the user selection of the transit time occurring from among the plurality of transit times in the user interface.

In Example 25, the subject matter of any one of Examples 14 to 24 may include, the third set of instructions for the order management system further including instructions to: transmit, to the preferred fulfillment location, a request to ship the quantity of the item to the destination.

In Example 26, the subject matter of any one of Examples 14 to 25 may include, the third set of instructions for the order management system further including instructions to: receive a rejection response to the request from the preferred fulfillment location; remove the preferred fulfillment location from the subset of fulfillment locations; and calculate, in response to the rejection response, using the transit time, the location, and the selection rule, a second preferred fulfillment location of the subset of fulfillment locations.

Example 27 includes subject matter (such as a computer-readable storage medium) comprising: storing, in a database, information about an item corresponding to a plurality of fulfillment locations, the information including a plurality of transit times and a plurality of transit costs corresponding to respective of the plurality of transit times; selecting, upon receiving a location of a user, a subset of transit times from the plurality of transit times; selecting a subset of transit costs from the plurality of transit costs, the subset of transit costs corresponding with the subset of transit times; receiving an indication of a selection of a transit time of the subset of transit times, the indication including the item, a quantity of the item, and a destination; and calculating, in response to receiving the indication, a preferred fulfillment location of a subset of fulfillment locations of the plurality of fulfillment locations corresponding to the subset of transit times, the calculating using the transit time, the location, and a selection rule, wherein the selection rule is generated using a plurality of selection attributes.

In Example 28, the subject matter of Example 27 may include, wherein the information about an item corresponding to the plurality of fulfillment locations includes an availability adjustment attribute corresponding to the item and respective fulfillment locations of the plurality of fulfillment locations.

In Example 29, the subject matter of any one of Examples 27 to 28 may include, wherein the selecting the subset of transit times comprises: determining an in-stock date attribute; calculating an available date using the in-stock date attribute and the availability adjustment attribute; and selecting the subset of transit times using the available date.

In Example 30, the subject matter of any one of Examples 27 to 29 may include, wherein the information about an item corresponding to the plurality of fulfillment locations includes a floor attribute corresponding to the item and respective fulfillment locations of the plurality of fulfillment locations.

In Example 31, the subject matter of any one of Examples 27 to 30 may include, wherein the selecting the subset of transit times comprises: determining a total quantity of the item for respective fulfillment locations of the plurality of fulfillment locations; calculating an above-floor quantity for the item using the total quantity and the floor attribute; and selecting the subset of transit times using the above-floor quantity.

In Example 32, the subject matter of any one of Examples 27 to 31 may include, wherein the information about an item corresponding to the plurality of fulfillment locations includes a threshold attribute corresponding to the item and respective fulfillment locations of the plurality of fulfillment locations.

In Example 33, the subject matter of any one of Examples 27 to 32 may include, wherein the selecting the subset of transit times comprises: determining a total quantity of the item for the subset of fulfillment locations; calculating an above-threshold quantity for the item using the total quantity and the threshold attribute; and selecting the subset of transit times using the above-threshold quantity.

In Example 34, the subject matter of any one of Examples 27 to 33 may include, wherein receiving the indication of the selection includes decrementing a total quantity of the item included in the information about the item corresponding to a fulfillment location of the plurality of fulfillment locations using the quantity of the item.

In Example 35, the subject matter of any one of Examples 27 to 34 may include, wherein the subset of transit times and the subset of transit costs corresponding with the subset of transit costs are displayed in correspondence of a subset of the information about the item in a user interface.

In Example 36, the subject matter of any one of Examples 27 to 35 may include, wherein the user interface is displayed on a website provided by a web server.

In Example 37, the subject matter of any one of Examples 27 to 36 may include, wherein the selection of the transit time is received in response to a user selection of the transit time, the user selection of the transit time occurring from among the plurality of transit times in an electronic commerce user interface.

In Example 38, the subject matter of any one of Examples 27 to 37 may include, further comprising: transmitting, to the preferred fulfillment location, a request to ship the quantity of the item to the destination.

In Example 39, the subject matter of any one of Examples 27 to 38 may include, further comprising: receiving a rejection response to the request from the preferred fulfillment location; removing the preferred fulfillment location from the subset of fulfillment locations; and calculating, in response to the rejection response, using the transit time, the location, and the selection rule, a second preferred fulfillment location of the subset of fulfillment locations.

Additional examples of the presently described method, system, and device embodiments include the following configurations recited by the claims. Each of the examples in the claims may stand on its own, or may be combined in any permutation or combination with any one or more of the other examples provided below or throughout the present disclosure.

What is claimed is:

1. A method, performed by processing circuitry of a computer system, the method comprising:
   storing, in a database, information about an item corresponding to a plurality of fulfillment locations, the fulfillment locations including at least one retail store location, and the information including:
      a plurality of transit times and a plurality of transit costs corresponding to respective of the plurality of transit times; and
      a floor minimum quantity calculated for the item at a respective retail store location of the at least one retail store location, the floor minimum quantity to holdback an amount of the item to be sold at the respective retail store location;
   receiving, from a user, a selection of a shipping speed and a shipping cost for a quantity of the item;
   receiving a location of the user, the location of the user corresponding to a geographic address associated with the user;
   selecting, responsive to receiving the location of the user, the shipping speed, and the shipping cost from the user, a subset of transit times from the plurality of transit times capable to fulfill the selection of the shipping speed;
   selecting a subset of transit costs from the plurality of transit costs, the subset of transit costs corresponding with the subset of transit times;
   determining a preferred fulfillment location of a subset of fulfillment locations of the plurality of fulfillment locations corresponding to the subset of transit times, the determining using the subset of transit times, the location of the user, and a selection rule, wherein the selection rule is generated using a plurality of selection attributes including quantities, wherein the quantities include the floor minimum quantity calculated for the item at the at least one retail store location; and
   transmitting, to the preferred fulfillment location, a request to ship the quantity of the item to the location of the user, wherein the preferred fulfillment location is a particular retail store location of the at least one retail store location.

2. The method of claim 1, wherein the information about an item corresponding to the plurality of fulfillment locations includes an availability adjustment attribute corresponding to the item and respective fulfillment locations of the plurality of fulfillment locations.

3. The method of claim 2, wherein the selecting the subset of transit times comprises:
   determining an in-stock date attribute;
   determining an available date using the in-stock date attribute and the availability adjustment attribute; and
   selecting the subset of transit times using the available date.

4. The method of claim 1, wherein the selecting the subset of transit times comprises:

determining a total quantity of the item for respective fulfillment locations of the plurality of fulfillment locations;

determining an above-floor quantity for the item, wherein the above-floor quantity is a number of the item greater than the floor minimum quantity calculated for the item; and selecting the subset of transit times using the above-floor quantity.

5. The method of claim 1, wherein the information about an item corresponding to the plurality of fulfillment locations includes a threshold quantity corresponding to the item and respective fulfillment locations of the plurality of fulfillment locations.

6. The method of claim 5, wherein the selecting the subset of transit times comprises:

determining a total quantity of the item for the subset of fulfillment locations;

determining an above-threshold quantity for the item using the total quantity and the threshold quantity; and selecting the subset of transit times using the above-threshold quantity.

7. The method of claim 1, the method further comprising, decrementing a total quantity of the item included in the information about the item corresponding to a fulfillment location of the plurality of fulfillment locations using the quantity of the item.

8. The method of claim 1, wherein the subset of transit times and the subset of transit costs corresponding with the subset of transit costs are displayed in correspondence of a subset of the information about the item in a user interface.

9. The method of claim 8, wherein the user interface is displayed on a website provided by a web server.

10. The method of claim 1, further comprising:

receiving a rejection response to the request from the preferred fulfillment location;

removing the preferred fulfillment location from the subset of fulfillment locations; and determining, in response to the rejection response, using the subset of transit times, the location of the user, and the selection rule, a second preferred fulfillment location of the subset of fulfillment locations.

11. A system comprising:

at least one processor;

at least one non-transitory computer-readable storage medium;

an inventory configuration system implemented using the at least one processor and the at least one computer-readable storage medium, the at least one computer-readable storage medium including a first set of instructions stored thereon which, when executed, cause the at least one processor to:

store, in a database, information about an item corresponding to a plurality of fulfillment locations, the fulfillment locations including at least one retail store location, and the information including:

a plurality of transit times and a plurality of transit costs corresponding to respective of the plurality of transit times; and a floor minimum quantity calculated for the item at a respective retail store location of the at least one retail store location, the floor minimum quantity to holdback an amount of the item to be sold at the respective retail store location;

an electronic pre-sourcing system implemented using the at least one processor and the at least one computer-readable storage medium, the at least one computer-readable storage medium including a second set of instructions stored thereon which, when executed, cause the at least one processor to:

receive a location of a user, the location of the user corresponding to a geographic address associated with the user;

receive, from the user, a selection of a shipping speed and a shipping cost for a quantity of the item;

an order management system implemented using the at least one processor and the at least one non-transitory computer-readable storage medium, the at least one computer-readable storage medium including a third set of instructions stored thereon which, when executed, cause the at least one processor to:

determine a preferred fulfillment location of a subset of fulfillment locations of the plurality of fulfillment locations corresponding to a subset of transit times, using the location of the user and a selection rule, wherein the selection rule is generated using a plurality of selection attributes including quantities, wherein the quantities include the floor minimum quantity calculated for the item at the at least one retail store location; and transmit, to the preferred fulfillment location, a request to ship the quantity of the item to the location of the user, wherein the preferred fulfillment location is a particular retail store location of the at least one retail store location.

12. The system of claim 11, wherein the information about an item corresponding to the plurality of fulfillment locations includes an availability adjustment attribute corresponding to the item and respective fulfillment locations of the plurality of fulfillment locations, a floor minimum quantity calculated for the item and respective fulfillment locations of the plurality of fulfillment locations, and a threshold quantity corresponding to the item and respective fulfillment locations of the plurality of fulfillment locations.

13. The system of claim 12, the second set of instructions for the electronic pre-sourcing system further including instructions to:

determine an in-stock date attribute; and determine an available date using the in-stock date attribute and the availability adjustment attribute.

14. The system of claim 12, the second set of instructions for the electronic pre-sourcing system further including instructions to:

Determine a total quantity of the item for respective fulfillment locations of the plurality of fulfillment locations; and determine an above-floor quantity for the item, wherein the above-floor quantity is a number of the item greater than the floor minimum quantity calculated for the item.

15. The system of claim 12, the second set of instructions for the electronic pre-sourcing system further including instructions to:

determine a total quantity of the item for the subset of fulfillment locations; and calculate an above-threshold quantity for the item using the total quantity and the threshold quantity.

16. The system of claim 11, wherein the second set of instructions for the electronic pre-sourcing system to receive the selection includes instructions to decrement a total quantity of the item included in the information about the item corresponding to a fulfillment location of the plurality of fulfillment locations using the quantity of the item.

17. The system of claim 11, the third set of instructions for the order management system further including instructions to:
- receive a rejection response to the request from the preferred fulfillment location;
- remove the preferred fulfillment location from the subset of fulfillment locations; and
- determine, in response to the rejection response, using the subset of transit times, the location, and the selection rule, a second preferred fulfillment location of the subset of fulfillment locations.

18. A non-transitory computer-readable medium including instructions stored thereon, wherein upon execution, the instructions cause at least one processor to perform the following operations:
- storing, in a database, information about an item corresponding to a plurality of fulfillment locations, the fulfillment locations including a retail store location and the information including:
  - a plurality of transit times and a plurality of transit costs corresponding to respective of the plurality of transit times; and
  - a floor minimum quantity calculated for the item at the retail store location, the floor minimum quantity to holdback an amount of the item to be sold at the retail store location;
- receiving, from a user, a selection of a shipping speed and a shipping cost for a quantity of the item;
- receiving, from the user, a location of the user, the location of the user corresponding to a geographic address associated with the user;
- selecting, responsive to receiving the location of the user, the shipping speed, and the shipping cost from the user, a subset of transit times from the plurality of transit times capable to fulfil the selection of the shipping speed;
- selecting a subset of transit costs from the plurality of transit costs, the subset of transit costs corresponding with the subset of transit times;
- determining a preferred fulfillment location of a subset of fulfillment locations of the plurality of fulfillment locations corresponding to the subset of transit times, the determining using the subset of transit times, the location of the user, and a selection rule, wherein the selection rule is generated using a plurality of selection attributes including quantities, wherein the quantities include the floor minimum quantity calculated for the item at the retail store location; and
- transmitting, to the preferred fulfillment location, a request to ship the quantity of the item to the location of the user, wherein the preferred fulfillment location is a particular retail store location of the retail store location.

19. The computer-readable medium of claim 18, wherein the information about an item corresponding to the plurality of fulfillment locations includes an availability adjustment attribute corresponding to the item and respective fulfillment locations of the plurality of fulfillment locations, a floor minimum quantity calculated for the item and respective fulfillment locations of the plurality of fulfillment locations, and a threshold quantity corresponding to the item and respective fulfillment locations of the plurality of fulfillment locations.

20. The computer-readable medium of claim 19, wherein the selecting the subset of transit times comprises:
- determining an in-stock date attribute;
- determining an available date using the in-stock date attribute and the availability adjustment attribute;
- determining a total quantity of the item for respective fulfillment locations of the plurality of fulfillment locations;
- determining an above-floor quantity for the item, wherein the above-floor quantity is a number of the item greater than the floor minimum quantity calculated for the item;
- determining a total quantity of the item for the subset of fulfillment locations;
- determining an above-threshold quantity for the item using the total quantity and the threshold quantity; and
- selecting the subset of transit times using at least one of the available date, the above-floor quantity, and the above-threshold quantity.

21. The computer-readable medium of claim 18, further comprising:
- receiving a rejection response to the request from the preferred fulfillment location;
- removing the preferred fulfillment location from the subset of fulfillment locations; and
- determining, in response to the rejection response, using the subset of transit times, the location, and the selection rule, a second preferred fulfillment location of the subset of fulfillment locations.

* * * * *